US012589588B2

(12) United States Patent
Orihara

(10) Patent No.: US 12,589,588 B2
(45) Date of Patent: Mar. 31, 2026

(54) LIQUID EJECTION APPARATUS, LIQUID EJECTION HEAD, AND METHOD OF CONTROLLING LIQUID EJECTION APPARATUS

(71) Applicant: SEIKO EPSON CORPORATION, Tokyo (JP)

(72) Inventor: Daichi Orihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 18/733,918

(22) Filed: Jun. 5, 2024

(65) Prior Publication Data

US 2024/0408867 A1 Dec. 12, 2024

(30) Foreign Application Priority Data

Jun. 7, 2023 (JP) ................................ 2023-094144

(51) Int. Cl.
*B41J 2/045* (2006.01)

(52) U.S. Cl.
CPC ....... *B41J 2/04581* (2013.01); *B41J 2/04563* (2013.01)

(58) Field of Classification Search
None
See application file for complete search history.

(56) References Cited

U.S. PATENT DOCUMENTS

2013/0064683 A1* 3/2013 Oshima ................. F04B 43/046 417/63
2016/0243825 A1* 8/2016 Kamiyanagi ........ B41J 2/04588
2020/0094547 A1 3/2020 Saito et al.
2023/0271413 A1* 8/2023 Nishihara ............ B41J 2/04551 347/14

FOREIGN PATENT DOCUMENTS

JP 2020-044771 A 3/2020

* cited by examiner

*Primary Examiner* — Scott A Richmond
(74) *Attorney, Agent, or Firm* — Spencer Fane LLP

(57) ABSTRACT

A liquid ejection apparatus includes an ejection portion including a piezoelectric element driven, a pressure chamber filled with a liquid and having a volume that changes according to driving, and a nozzle ejecting the liquid in the pressure chamber according to a change of the volume of the pressure chamber, a detection unit detecting a vibration signal indicating a potential of the piezoelectric element that varies according to a vibration remaining in the ejection portion after driving of the piezoelectric element and generating a detection signal based on the detected vibration signal, and a setting unit setting a signal amplification factor based on liquid characteristic information related to characteristics of the liquid ejected by the ejection portion and element characteristic information related to characteristics of the piezoelectric element, wherein the detection unit generates the detection signal by amplifying the vibration signal according to the signal amplification factor set by the setting unit.

13 Claims, 11 Drawing Sheets

| Sd[m] | D[m] | Rc[m] | | Rs[m] | |
|---|---|---|---|---|---|
| | | TQ1 | TQ2 | TQ1 | TQ2 |
| 1 | DP-1 | H | L | L | L |
| 2 | DP-2 | L | H | L | L |
| 3 | DP-3 | L | L | L | L |

| Sd[m] | D[m] | Rc[m] | | | Rs[m] | | |
|---|---|---|---|---|---|---|---|
| | | TS1 | TS2 | TS3 | TS1 | TS2 | TS3 |
| 4 | DH | H | L | L | L | H | L |

| TC | SH1 |
|---|---|
| TC < Tth1 | 2 : EJECTION ABNORMALITY (AIR BUBBLES) |
| Tth1 ≤ TC ≤ Tth2 | 1 : NORMAL |
| Tth2 < TC ≤ Tth3 | 3 : EJECTION ABNORMALITY (FOREIGN MATTER) |
| Tth3 < TC | 4 : EJECTION ABNORMALITY (INCREASE IN VISCOSITY) |

LIQUID EJECTION APPARATUS, LIQUID EJECTION HEAD, AND METHOD OF CONTROLLING LIQUID EJECTION APPARATUS

The present application is based on, and claims priority from JP Application Serial Number 2023-094144, filed Jun. 7, 2023, the disclosure of which is hereby incorporated by reference herein in its entirety.

BACKGROUND

1. Technical Field

The present disclosure relates to a liquid ejection apparatus, a liquid ejection head, and a method of controlling a liquid ejection apparatus.

2. Related Art

A liquid ejection apparatus such as an inkjet printer forms an image on a medium by driving a piezoelectric element provided in an ejection portion provided in a liquid ejection head to eject a liquid such as an ink filled in a pressure chamber provided in the ejection portion from a nozzle. However, in the liquid ejection apparatus, the ejection portion may fail to normally eject the liquid, that is, an ejection abnormality may occur. Therefore, in related art, a technique of determining an ejection state in the ejection portion is proposed. For example, JP-A-2020-044771 discloses a technique of determining an ejection state of an ejection portion based on a detection signal obtained by amplification of a vibration signal indicating a vibration remaining in the ejection portion after driving of a piezoelectric element.

JP-A-2020-044771 is an example of the related art.

However, the amplitude of the vibration remaining in the ejection portion after driving of the piezoelectric element varies according to the characteristics of the liquid ejected by the ejection portion and the characteristics of the piezoelectric element. Therefore, when the ejection state of the ejection portion is determined based on the detection signal obtained by amplification of the vibration signal indicating the vibration remaining in the ejection portion by a constant amplification factor, the determination of the ejection state may be inaccurate because the detection signal has an inappropriate amplitude.

SUMMARY

A liquid ejection apparatus according to an aspect of the present disclosure includes an ejection portion including a piezoelectric element driven by a drive signal, a pressure chamber filled with a liquid and having a volume that changes according to driving of the piezoelectric element, and a nozzle ejecting the liquid in the pressure chamber in response to a change of the volume of the pressure chamber, a detection unit detecting a vibration signal indicating a potential of the piezoelectric element that fluctuates according to a vibration remaining in the ejection portion after driving of the piezoelectric element and generating a detection signal based on the detected vibration signal, and a setting unit setting a signal amplification factor based on liquid characteristic information related to characteristics of the liquid ejected by the ejection portion and element characteristic information related to characteristics of the piezoelectric element, wherein the detection unit generates the detection signal by amplifying the vibration signal according to the signal amplification factor set by the setting unit.

A liquid ejection head according to another aspect of the present disclosure includes an ejection portion including a piezoelectric element driven by a drive signal, a pressure chamber filled with a liquid and having a volume that changes according to driving of the piezoelectric element, and a nozzle ejecting the liquid in the pressure chamber in response to a change of the volume of the pressure chamber, and a detection unit detecting a vibration signal indicating a potential of the piezoelectric element that fluctuates according to a vibration remaining in the ejection portion after driving of the piezoelectric element and generating a detection signal based on the detected vibration signal, wherein the detection unit generates the detection signal by amplifying the vibration signal according to a signal amplification factor set based on liquid characteristic information related to characteristics of the liquid ejected by the ejection portion and element characteristic information related to characteristics of the piezoelectric element.

A method of controlling a liquid ejection apparatus according to another aspect of the present disclosure is a method of controlling a liquid ejection apparatus including an ejection portion including a piezoelectric element driven by a drive signal, a pressure chamber filled with a liquid and having a volume that changes according to driving of the piezoelectric element, and a nozzle ejecting the liquid in the pressure chamber in response to a change of the volume of the pressure chamber, including detecting a vibration signal indicating a potential of the piezoelectric element that fluctuates according to a vibration remaining in the ejection portion after driving of the piezoelectric element, setting a signal amplification factor based on liquid characteristic information related to characteristics of the liquid ejected by the ejection portion and element characteristic information related to characteristics of the piezoelectric element, and generating the detection signal by amplifying the vibration signal according to the signal amplification factor set by the setting unit.

DESCRIPTION OF EMBODIMENTS

As below, embodiments of the present disclosure will be described with reference to the drawings. In the respective drawings, the dimensions and the scales of the respective parts are appropriately different from the real ones. Further, the following embodiments are preferable specific examples of the present disclosure and various technically preferable limitations are imposed thereon, however, the scope of the present disclosure is not limited to the embodiments unless such limitation is specifically stated in the following description.

A. Embodiment

In the embodiment, a liquid ejection apparatus will be described using an inkjet printer that ejects ink to form an image on a recording sheet PP as an example.

1. Overview of Inkjet Printer

As below, an example of a configuration of an inkjet printer 1 according to the embodiment will be described with reference to FIGS. 1 to 3.

Figure 1:
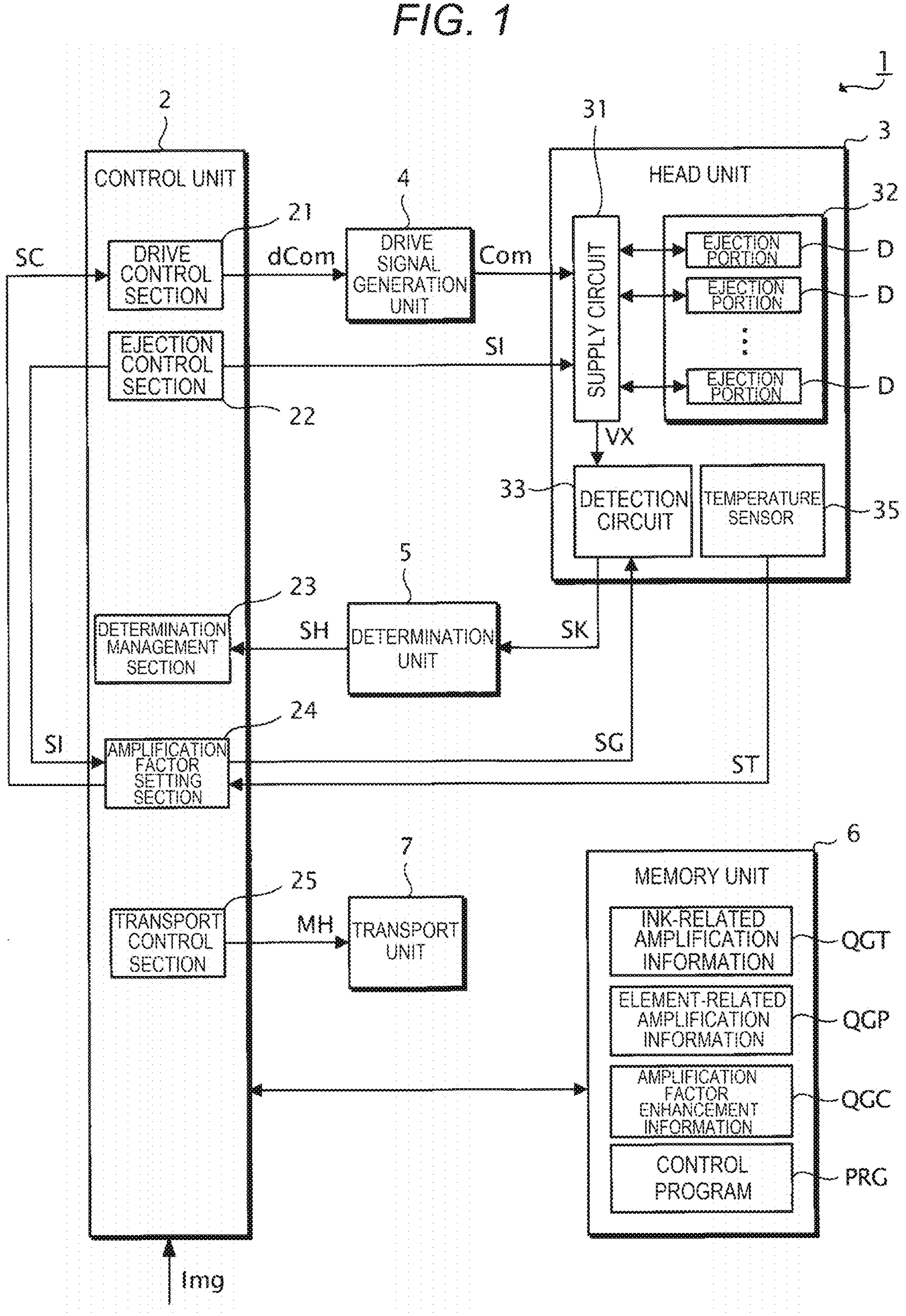
FIG. 1 is a block diagram showing an example of a configuration of an inkjet printer 1 according to an embodiment of the present disclosure.

FIG. 1 is a functional block diagram showing an example of the configuration of the inkjet printer 1.

As shown in FIG. 1, print data Img representing an image to be formed by the inkjet printer 1 is supplied to the inkjet printer 1 from a personal computer or a host computer such as a digital camera. The inkjet printer 1 executes printing processing of forming an image represented by the print data Img supplied from the host computer on recording sheet PP.

As shown in FIG. 1, the inkjet printer 1 includes a control unit 2 that controls the respective sections of the inkjet printer 1, a head unit 3 provided with ejection portions D that eject inks, a drive signal generation unit 4 that generates a drive signal Com for driving the ejection portion D, a determination unit 5 that determines an ejection state of the ink in the ejection portion D, a memory unit 6 that stores various types of information, and a transport unit 7 that changes a relative position of the recording sheet PP to the head unit 3.

In the embodiment, the inkjet printer 1 is an example of "liquid ejection apparatus", the head unit 3 is an example of "liquid ejection head", the ink is an example of "liquid", the drive signal generation unit 4 is an example of "drive signal generation unit", and the determination unit 5 is an example of "determination unit".

In the embodiment, it is assumed that the inkjet printer 1 includes one or more head units 3, one or more drive signal generation units 4 corresponding to the one or more head units 3 on a one-to-one basis and one or more determination units 5 corresponding to the one or more head units 3 on a one-to-one basis. More specifically, in the embodiment, it is assumed that the inkjet printer 1 includes four head units 3, four drive signal generation units 4 corresponding to the four head units 3 on a one-to-one basis, and four determination units 5 corresponding to the four head units 3 on a one-to-one basis. However, for convenience of description, as shown in FIG. 1, the explanation will be made with a focus on one head unit 3 of the four head units 3, one drive signal generation unit 4 provided to correspond to the one head unit 3 of the four drive signal generation units 4, and one determination unit 5 provided to correspond to the one head unit 3 of the four determination units 5.

The control unit 2 includes one or more CPUs (Central Processing Units). However, the control unit 2 may include a programmable logic device such as an FPGA (field-programmable gate array) in place of or in addition to the CPU.

The memory unit 6 includes one or both of a volatile memory such as a RAM (random access memory) and a nonvolatile memory such as a ROM (read only memory), an EEPROM (electrically erasable programmable read-only memory), and a PROM (programmable ROM). As will be described in detail later, the memory unit 6 stores a control program PRG, ink-related amplification information QGT, element-related information QGP, and amplification factor enhancement information QGC of the inkjet printer 1.

The control unit 2 executes the control program PRG stored in the memory unit 6 and operates according to the control program PRG to function as a drive control section 21, an ejection control section 22, a determination management section 23, an amplification factor setting section 24, and a transport control section 25.

The drive control section 21 generates a waveform designation signal dCom and supplies the generated waveform designation signal dCom to the drive signal generation unit 4. Here, the waveform designation signal dCom is a digital signal that defines the waveform of the drive signal Com. The drive signal Com is an analog signal for driving the ejection portion D. The drive signal generation unit 4 generates a drive signal Com having a waveform defined by the waveform designation signal dCom, and supplies the generated drive signal Com to the head unit 3.

The ejection control section 22 generates a designation signal SI and supplies the generated designation signal SI to the head unit 3. Here, the designation signal SI is a digital signal for designating a type of operation of the ejection portion D. Specifically, the designation signal SI is a signal that designates the type of operation of the ejection portion D by designating whether to supply the drive signal Com to the ejection portion D.

The head unit 3 includes a supply circuit 31, a recording head 32, a detection circuit 33, and a temperature sensor 35.

The recording head 32 includes M ejection portions D. Here, the value M is a natural number satisfying "$M \geq 2$". Hereinafter, among the M ejection portions D provided in the recording head 32, the m-th ejection portion D may be referred to as "ejection portion D[m]". Here, the variable m is a natural number satisfying "$1 \leq m \leq M$". Hereinafter, when a component element, a signal, or the like of the inkjet printer 1 corresponds to the ejection portion D[m] among the M ejection portions D, a subscript [m] may be added to a reference numeral showing the component element, the signal, or the like.

The supply circuit 31 switches whether to supply the drive signal Com to the ejection portion D[m] based on the designation signal SI. Hereinafter, among the drive signals Com, the drive signal Com supplied to the ejection portion D[m] may be referred to as a supply drive signal Vin[m].

The supply circuit 31 switches whether to supply the detection circuit 33 with a vibration signal VX[m] indicating a potential of an upper electrode Zu[m] provided in a piezoelectric element PZ[m] of the ejection portion D[m] based on the designation signal SI. Hereinafter, when the vibration signal VX[m] is supplied from the ejection portion D[m] to the detection circuit 33, the ejection portion D[m] may be referred to as a determination target ejection portion DH. The piezoelectric element PZ[m] and the upper electrode Zu[m] will be described later with reference to FIG. 3.

The detection circuit 33 generates a detection signal SK[m] based on the vibration signal VX[m] supplied from the ejection portion D[m] as the determination target ejection portion DH via the supply circuit 31. Specifically, the detection circuit 33 amplifies the vibration signal VX[m] to generate the detection signal SK[m]. In the embodiment, the detection circuit 33 is an example of "detection unit".

The temperature sensor 35 measures a temperature AT of the head unit 3 and outputs a temperature signal ST indicating the measurement result. The ink ejected by the ejection portion D[m] has a temperature corresponding to the temperature AT indicated by the temperature signal ST. The ink ejected by the ejection portion D[m] has viscosity corresponding to the temperature AT indicated by the temperature signal ST. That is, the temperature signal ST indicates the temperature AT corresponding to the temperature and the viscosity of the ink ejected by the ejection portion D[m]. In the embodiment, the temperature of the ink ejected by the ejection portion D[m] is an example of "characteristics of the liquid ejected by the ejection portion", and the viscosity of the ink ejected by the ejection portion D[m] is another example of "characteristics of the liquid ejected by the ejection portion". In the embodiment, the information indicated by the temperature signal ST is an "liquid example of characteristic information".

The amplification factor setting section 24 generates an amplification factor designation signal SG based on the temperature signal ST and the designation signal SI. Here, the amplification factor designation signal SG is a signal for designating an amplification factor AG[m] of the vibration signal VX[m] in the detection circuit 33. In the embodiment, the amplification factor AG[m] is an example of "signal amplification factor". Hereinafter, the processing of generating the amplification factor designation signal SG by the amplification factor setting section 24 may be referred to as amplification factor setting processing.

Specifically, in the amplification factor setting processing, the amplification factor setting section 24 first generates number of times of piezoelectric driving information SP based on the designation signal SI. Here, the number of times of piezoelectric driving information SP is information indicating numbers of times of piezoelectric driving AP[1] to AP[M] corresponding to the ejection portions D[1] to D[M]. Of the numbers, the number of times of piezoelectric driving AP[m] is the number of times of driving of the piezoelectric element PZ[m] provided in the ejection portion D[m] in a period from the product shipment of the inkjet printer 1 to the present. In the embodiment, the number of times of driving of the piezoelectric element PZ[m] is an example of "characteristics of the piezoelectric element". In the embodiment, the number of times of piezoelectric driving information SP is an example of "element characteristic information".

In the amplification factor setting processing, the amplification factor setting section 24 sets the amplification factor AG[m] based on the temperature signal ST and the number of times of piezoelectric driving information SP, and generates the amplification factor designation signal SG indicating the amplification factor AG[m]. Next, the amplification factor setting section 24 supplies the amplification factor designation signal SG to the detection circuit 33. The detection circuit 33 generates the detection signal SK[m] by amplifying the vibration signal VX[m] according to the amplification factor AG[m] indicated by the amplification factor designation signal SG.

In the embodiment, the amplification factor setting section 24 is an example of "setting unit".

In the amplification factor setting processing, the amplification factor setting section 24 generates a drive waveform correction signal SC based on the temperature signal ST and the designation signal SI. Here, the drive waveform correction signal SC is a signal for instructing correction of the waveform of the drive signal Com, and is a signal indicating the amplitude AC of the drive signal Com after correction. When the drive waveform correction signal SC is supplied from the amplification factor setting section 24, the drive control section 21 corrects the waveform designation signal dCom so that the amplitude of the drive signal Com becomes the amplitude AC indicated by the drive waveform correction signal SC.

The determination unit 5 determines the ejection state of the ink in the ejection portion D[m] based on the detection signal SK[m]. In other words, the determination unit 5 determines whether an ejection abnormality occurs in the ejection portion D[m] based on the detection signal SK[m]. Here, the ejection abnormality is a generic term of a state in which the ejection portion D[m] fails to normally eject the ink from a nozzle N thereof. For example, the ejection abnormality includes a state in which the ejection portion D[m] fails to eject the ink, a state in which the ejection portion D[m] ejects the ink in an amount different from the ejection amount of the ink defined by the drive signal Com, and a state in which the ejection portion D[m] ejects the ink at a speed different from the ejection speed of the ink defined by the drive signal Com.

Hereinafter, the processing of determining the ejection state in the ejection portion D[m] based on the detection signal SK[m] is referred to as ejection state determination processing.

Hereinafter, the processing of driving the ejection portion D[m] as the determination target ejection portion DH and detecting the vibration signal VX[m] from the ejection portion D[m] is referred to as determination target driving processing.

The determination unit 5 generates result information SH based on the determination result of the ink ejection state, and supplies the generated result information SH to the determination management section 23. The determination management section 23 manages the result information SH supplied from the determination unit 5. Here, the result information SH includes determination result information SH1[m] indicating the determination result of the ink ejection state in the ejection portion D[m], and amplitude information SH2[m] indicating the amplitude AK[m] of the detection signal SK[m].

As described above, the inkjet printer 1 executes the printing processing. When the printing processing is executed, the ejection control section 22 generates a signal for controlling the head unit 3 including the designation signal SI based on the print data Img. The drive control section 21 generates a signal for controlling the drive signal generation unit 4 including the waveform designation signal dCom. The transport control section 25 generates a transport control signal MH for controlling the transport unit 7.

Thereby, in the printing processing, the control unit 2 controls the transport unit 7 to change the relative position of the recording sheet PP to the head unit 3, adjusts the presence or absence of the ink ejected from the ejection portion D[m], the ejection amount of the ink, the ejection timing of the ink, and the like, and controls the respective parts of the inkjet printer 1 to form an image corresponding to the print data Img on the recording sheet PP.

Hereinafter, the printing processing and the determination target driving processing may be collectively referred to as ejection portion driving processing.

Figure 2:
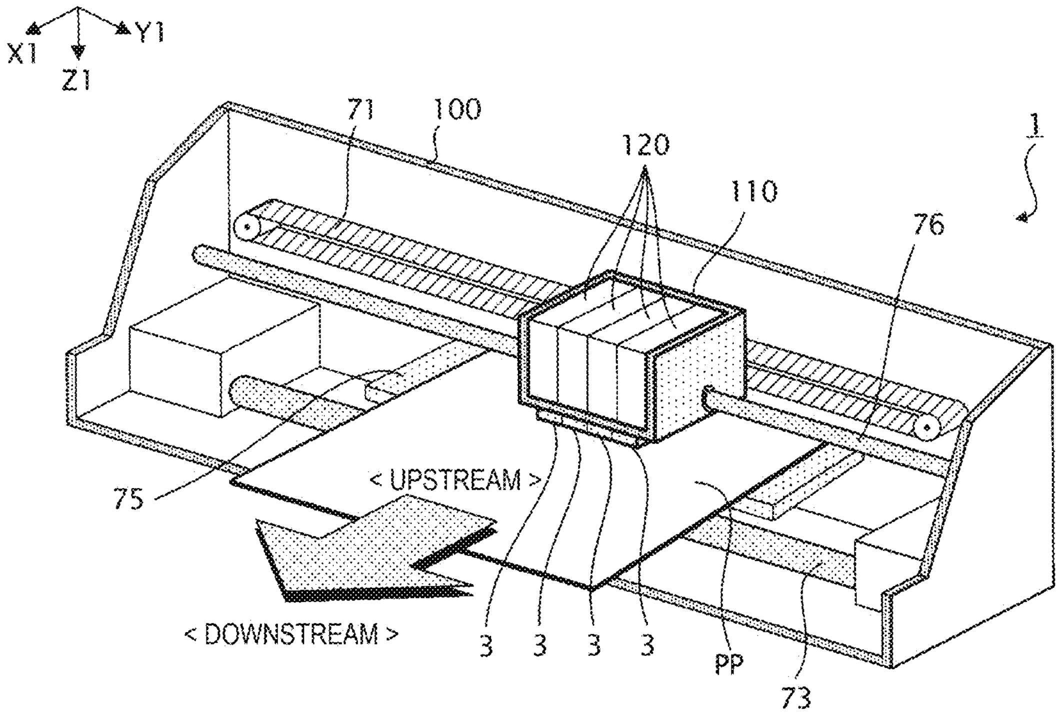
FIG. 2 is a perspective view showing an example of a schematic structure of the inkjet printer 1.

FIG. 2 is a perspective view showing an example of a schematic internal structure of the inkjet printer 1.

As shown in FIG. 2, the embodiment assumes a case where the inkjet printer 1 is a serial printer. Specifically, when executing the printing processing, the inkjet printer 1 forms dots Dt according to the print data Img on the recording sheet PP by ejecting the ink from the ejection portion D[m] while transporting the recording sheet PP in an X1 direction and reciprocating the head unit 3 in a Y1 direction intersecting the X1 direction and a Y2 direction opposite to the Y1 direction.

Hereinafter, the X1 direction and an X2 direction opposite thereto are collectively referred to as "X-axis direction", the Y1 direction intersecting the X-axis direction and the Y2 direction opposite thereto are collectively referred to as "Y-axis direction", and a Z1 direction intersecting the X-axis direction and the Y-axis direction and a Z2 direction opposite thereto are collectively referred to as "Z-axis direction". In the embodiment, a case where the X-axis direction, the Y-axis direction, and the Z-axis direction are orthogonal to one other will be described as an example. However, the present disclosure is not limited to the configuration. It is only necessary that the X-axis direction, the Y-axis direction, and the Z-axis direction intersect one another. In the embodiment, the Z1 direction is a direction in which the ink is ejected from the ejection portion D[m].

As shown in FIG. 2, the inkjet printer according to the embodiment includes a housing 100 and a carriage 110 that can reciprocate in the Y axis direction within the housing 100 with the four head units 3 mounted thereon.

In the embodiment, as shown in FIG. 2, it is assumed that the carriage 110 holds four ink cartridges 120 corresponding to inks in four colors of cyan, magenta, yellow, and black on a one-to-one basis. In the embodiment, as described above, it is assumed that the inkjet printer 1 includes the four head units 3 corresponding to the four ink cartridges 120 on a one-to-one basis. Each ejection portion D[m] is supplied with the ink from the ink cartridge 120 corresponding to the head unit 3 provided with the ejection portion D[m]. Thereby, each of the ejection portions D[m] may be filled with the supplied ink and eject the filled ink from the nozzle N. The ink cartridge 120 may be provided outside the carriage 110.

As described above, the inkjet printer 1 according to the embodiment includes the transport unit 7. The transport unit 7 includes a carriage transport mechanism 71 for reciprocating the carriage 110 in the Y-axis direction, a carriage guide shaft 76 for supporting the carriage 110 to reciprocate in the Y-axis direction, a medium transport mechanism 73 for transporting the recording sheet PP, and a platen 75 provided in the Z1 direction of the carriage 110. Accordingly, when the printing processing is executed, the transport unit 7 controls the carriage transport mechanism 71 to reciprocate the head units 3 in the Y-axis direction along the carriage guide shaft 76 together with the carriage 110 and controls the medium transport mechanism 73 to transport the recording sheet PP on the platen 75 in the X1 direction, and thereby, the relative position of the recording sheet PP to the head units 3 is changed to enable landing of the inks over the entire of the recording sheet PP.

Figure 3:
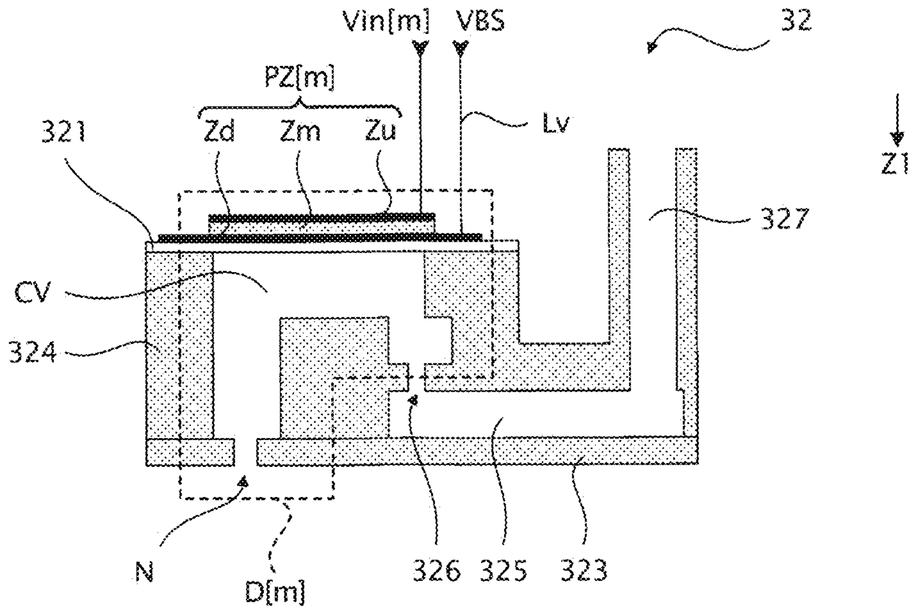
FIG. 3 is a cross-sectional view for explanation of an example of a structure of an ejection portion D[m].

FIG. 3 is a schematic partial cross-sectional view of the recording head 32 when the recording head 32 is cut to include the ejection portion D[m].

As shown in FIG. 3, the ejection portion D[m] includes a piezoelectric element PZ[m], a cavity CV[m] filled with the ink, a nozzle N[m] communicating with the cavity CV[m], and a vibrating plate 321. The ejection portion D[m] ejects the ink in the cavity CV[m] from the nozzle N[m] by the piezoelectric element PZ[m] being driven by the supply drive signal Vin[m]. The cavity CV[m] is a space defined by a cavity plate 324, a nozzle plate 323 in which the nozzle N[m] is formed, and the vibrating plate 321. The cavity CV[m] communicates with a reservoir 325 via an ink supply port 326. The reservoir 325 communicates with the ink cartridge 120 corresponding to the ejection portion D[m] via an ink intake port 327. The piezoelectric element PZ[m] includes an upper electrode Zu[m], a lower electrode Zd[m], and a piezoelectric material Zm[m] provided between the upper electrode Zu[m] and the lower electrode Zd[m]. The lower electrode Zd[m] is electrically coupled to a feed line Lv set at a predetermined potential VBS. When the supply drive signal Vin[m] is supplied to the upper electrode Zu[m] and a voltage is applied between the upper electrode Zu[m] and the lower electrode Zd[m], the piezoelectric element PZ[m] is displaced in the Z1 direction or the Z2 direction according to the applied voltage, and as a result, the piezoelectric element PZ[m] vibrates. The lower electrode Zd[m] is bonded to the vibrating plate 321. Accordingly, when the piezoelectric element PZ[m] is driven by the supply drive signal Vin[m] and vibrates, the vibrating plate 321 also vibrates. Then, the volume of the cavity CV[m] and the pressure in the cavity CV[m] change due to the vibration of the vibrating plate 321, and the ink filled in the cavity CV[m] is ejected from the nozzle N[m]. In the embodiment, the piezoelectric element PZ[m] is an example of "piezoelectric element", and the cavity CV[m] is an example of "pressure chamber".

2. Overview of Head Unit

As below, an overview of the head unit 3 will be described with reference to FIGS. 4 to 7.

Figure 4:
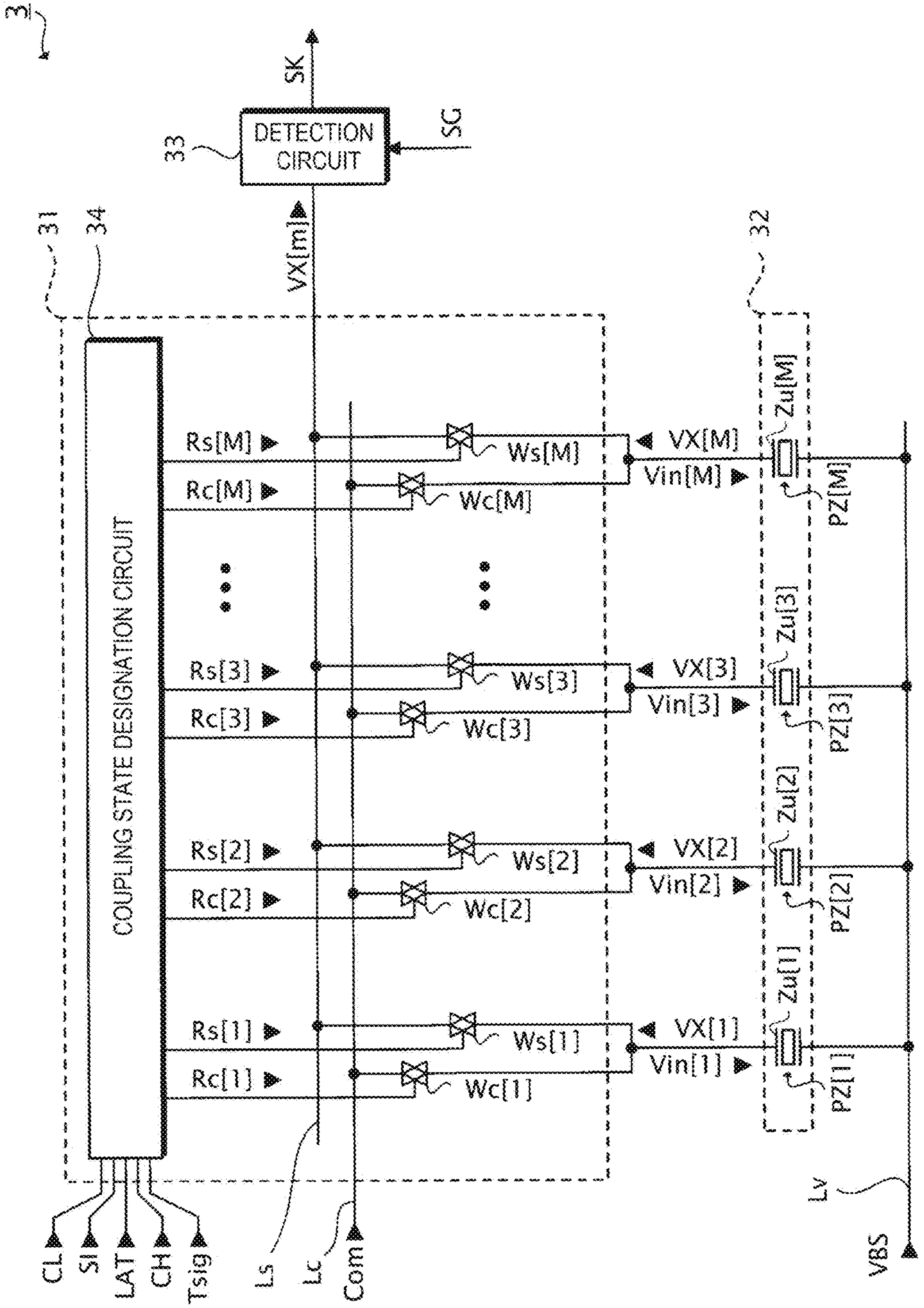
FIG. 4 is a block diagram showing an example of a configuration of a head unit 3.

FIG. 4 is a block diagram showing an example of the configuration of the head unit 3.

As shown in FIG. 4, the head unit 3 includes the supply circuit 31, the recording head 32, and the detection circuit 33. The head unit 3 includes a wire Lc to which the drive signal Com is supplied from the drive signal generation unit 4, and a wire Ls for supplying the vibration signal VX[m] to the detection circuit 33.

The supply circuit 31 includes M switches Wc[1] to Wc[M] corresponding to the M ejection portions D[1] to D[M] on a one-to-one basis, M switches Ws[1] to Ws[M] corresponding to the M ejection portions D[1] to D[M] on a one-to-one basis, and a coupling state designation circuit 34 for designating coupling of the respective switches.

The coupling state designation circuit 34 generates a coupling state designation signal Rc[m] for designating ON/OFF of the switch Wc[m] and a coupling state designation signal Rs[m] for designating ON/OFF of the switch Ws[m] based on the designation signal SI, the latch signal LAT, the change signal CH, and a period designation signal Tsig supplied from the control unit 2.

The switch Wc[m] switches conduction and non-conduction between the wire Lc and the upper electrode Zu[m] of the piezoelectric element PZ[m] based on the coupling state designation signal Rc[m]. In the embodiment, the switch Wc[m] is turned on when the coupling state designation signal Rc[m] is at a high level, and is turned off when the signal is at a low level. When the switch Wc[m] is turned on, the drive signal Com supplied to the wire Lc is supplied to the upper electrode Zu[m] of the ejection portion D[m] as the supply drive signal Vin[m].

The switch Ws[m] switches conduction and non-conduction between the wire Ls and the upper electrode Zu[m] of the piezoelectric element PZ[m] based on the coupling state designation signal Rs[m]. In the embodiment, the switch Ws[m] is turned on when the coupling state designation signal Rs[m] is at a high level, and is turned off when the signal is at a low level. When the switch Ws[m] is turned on, the vibration signal VX[m] indicating the potential of the upper electrode Zu[m] provided in the ejection portion D[m] is supplied from the upper electrode Zu[m] to the detection circuit 33 via the wire Ls.

The detection circuit 33 generates a detection signal SK[m] having a waveform corresponding to the waveform of the vibration signal VX[m] based on the vibration signal VX[m] supplied from the wire Ls and the amplification factor designation signal SG supplied from the amplification factor setting section 24. Specifically, the detection circuit 33 generates the detection signal SK[m] by amplifying the vibration signal VX[m] by the amplification factor AG[m] indicated by the amplification factor designation signal SG.

In the embodiment, when the inkjet printer 1 executes the printing processing or the ejection state determination processing, one or more unit periods TP are set as the operating period of the inkjet printer 1. In each unit period TP, the inkjet printer 1 can drive each ejection portion D[m] for the ejection portion driving processing including the printing processing and the determination target driving processing.

Figures 5, 6:
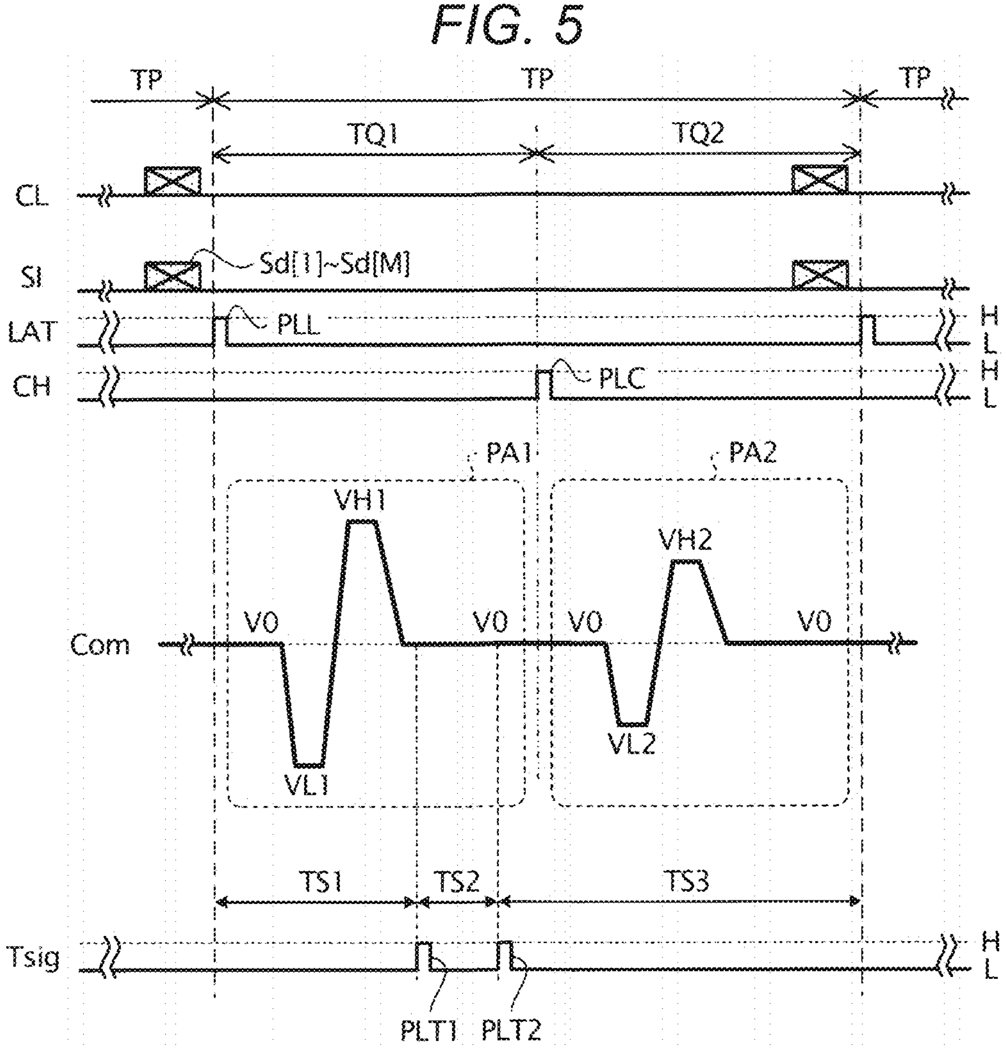
FIG. 5 is a timing chart for explanation of examples of signals supplied to the head unit 3.
FIG. 6 is a diagram for explanation of examples of individual designation signals Sd[m].

FIG. 5 is a timing chart showing examples of various signals including the drive signal Com supplied to the head unit 3 in the unit period TP.

As shown in FIG. 5, the control unit 2 outputs a latch signal LAT having a pulse PLL. Thereby, the control unit 2 defines the unit period TP as a period from the rise of the pulse PLL to the rise of the next pulse PLL.

The control unit 2 outputs a change signal CH having a pulse PLC in the unit period TP. The control unit 2 divides the unit period TP into a driving period TQ1 from the rise of the pulse PLL to the rise of the pulse PLC and a driving period TQ2 from the rise of the pulse PLC to the rise of the pulse PLL.

The control unit 2 outputs the period designation signal Tsig having a pulse PLT1 and a pulse PLT2 in the unit period TP. The control unit 2 divides the unit period TP into a control period TS1 from the rise of the pulse PLL to the rise of the pulse PLT1, a control period TS2 from the rise of the pulse PLT1 to the rise of the pulse PLT2, and a control period TS3 from the rise of the pulse PLT2 to the rise of the pulse PLL.

As shown in FIG. 5, the designation signal SI includes M individual designation signals Sd[1] to Sd[M] corresponding to the M ejection portions D[1] to D[M] on a one-to-one basis. The individual designation signal Sd[m] designates a drive mode of the ejection portion D[m] in each unit period TP when the inkjet printer 1 executes the printing processing or the ejection state determination processing. Prior to each unit period TP, the control unit 2 supplies the designation signal SI including the M individual designation signals Sd[1] to Sd[M] to the coupling state designation circuit 34 in synchronization with a clock signal CL. In the unit period TP, the coupling state designation circuit 34 generates the coupling state designation signal Rc[m] and the coupling state designation signal Rs[m] based on the individual designation signal Sd[m].

In the embodiment, when the inkjet printer 1 executes the printing processing or the determination target driving processing, it is assumed that the ejection portion D[m] can form a dot Dt of a large dot of the ink in an ink amount ξ1 or a small dot of the ink in an ink amount ξ2 smaller than the ink amount ξ1.

Figures 7, 8, 9:
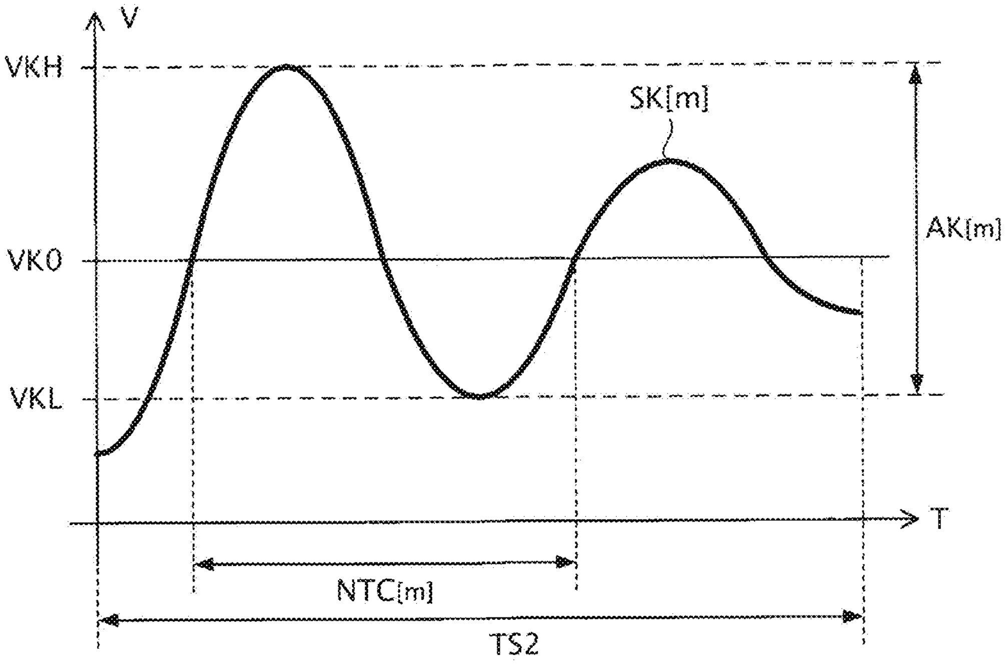
FIG. 7 is a diagram for explanation of an example of the individual designation signal Sd[m].
FIG. 8 is a timing chart for explanation of an example of a detection signal SK[m].
FIG. 9 is a diagram for explanation of an example of ejection state determination processing.

FIGS. 6 and 7 are explanatory diagrams for explanation of examples of the individual designation signal Sd[m].

As shown in FIGS. 6 and 7, in the embodiment, the individual designation signal Sd[m] indicates any one of four values in the unit period TP: a value "1" designating the ejection portion D[m] as a large dot forming ejection portion DP-1; a value "2" designating the ejection portion D[m] as a small dot forming ejection portion DP-2; a value "3" designating the ejection portion D[m] as a non-driven ejection portion DP-3; and a value "4" designating the ejection portion D[m] as the determination target ejection portion DH.

Here, the large dot forming ejection portion DP-1 is the ejection portion D that forms the large dot in the unit period TP. The small dot formation ejection portion DP-2 is the ejection portion D that forms the small dot in the unit period TP. The non-driven ejection portion DP-3 is the ejection portion D that is not driven by the drive signal Com in the unit period TP. The determination target ejection portion DH is the ejection portion D to be subjected to the ejection state determination processing in the unit period TP.

The description returns to FIG. 5.

As shown in FIG. 5, in the embodiment, the drive signal Com has a waveform PA1 provided in the driving period TQ1 and a waveform PA2 provided in the driving period TQ2.

The waveform PA1 returns from a reference potential V0 to the reference potential V0 through a potential VL1 lower than the reference potential V0 and a potential VH1 higher than the reference potential V0 in the control period TS1 of the driving period TQ1, and maintains the reference potential V0 in the control period TS2 and the control period TS3 of the driving period TQ1. When the supply drive signal Vin[m] having the waveform PA1 is supplied to the ejection portion D[m], the waveform PA1 is determined so that the ink corresponding to the ink amount ξ1 is ejected from the ejection portion D[m].

The waveform PA2 is a waveform that returns from the reference potential V0 to the reference potential V0 through a potential VL2 lower than the reference potential V0 and a potential VH2 higher than the reference potential V0 in the driving period TQ2. When the supply drive signal Vin[m] having the waveform PA2 is supplied to the ejection portion D[m], the waveform PA2 is determined so that the ink corresponding to the ink amount ξ2 is ejected from the ejection portion D[m].

In the embodiment, as an example, it is assumed that when the potential of the supply drive signal Vin[m] supplied to the ejection portion D[m] is a high potential, the volume of the cavity CV[m] provided in the ejection portion D[m] is smaller than that when the potential is a low potential. Therefore, when the ejection portion D[m] is driven by the supply drive signal Vin[m] having the waveform PA1 and the like, the potential of the supply drive signal Vin[m] changes from the low potential to the high potential, and thereby, the ink in the ejection portion D[m] is ejected from the nozzle N[m].

Next, the operation of the ejection portion D[m] designated by the individual designation signal Sd[m] will be described with reference to FIGS. 6 and 7.

As shown in FIG. 6, individual designation signal Sd[m] indicates the value "1" that designates the ejection portion D[m] as the large dot forming ejection portion DP-1 in the unit period TP, the coupling state designation circuit 34 sets the coupling state designation signal Rc[m] to the high level in the driving period TQ1. In this case, the switch Wc[m] is turned on in the driving period TQ1. Accordingly, the ejection portion D[m] is driven by the supply drive signal Vin[m] having the waveform PA1 in the unit period TP, and ejects the ink in the ink amount ξ1 corresponding to the large dot.

When the individual designation signal Sd[m] indicates the value "2" that designates the ejection portion D[m] as the small dot forming ejection portion DP-2 in the unit period TP, the coupling state designation circuit 34 sets the coupling state designation signal Rc[m] to the high level in the driving period TQ2. In this case, the switch Wc[m] is turned on in the driving period TQ2. Accordingly, the ejection portion D[m] is driven by the supply drive signal Vin[m] having the waveform PA2 in the unit period TP, and ejects the ink in the ink amount ξ2 corresponding to the small dot.

When the individual designation signal Sd[m] indicates the value "3" that designates the ejection portion D[m] as the non-driven ejection portion DP-3 in the unit period TP, the coupling state designation circuit 34 sets the coupling state designation signal Rc[m] and the coupling state designation signal Rs[m] to the low level over the unit period TP. In this case, the switch Wc[m] and the switch Ws[m] off for the unit period TP. Accordingly, the ejection portion D[m] is not driven by the drive signal Com in the unit period TP, and does not eject ink.

As shown in FIG. 7, when the individual designation signal Sd[m] indicates the value "4" that designates the ejection portion D[m] as the determination target ejection portion DH in the unit period TP, the coupling state designation circuit 34 sets the coupling state designation signal Rc[m] to the high level in the control period TS1 and sets the coupling state designation signal Rs[m] to the high level in the control period TS2. In this case, the switch Wc[m] is turned on in the control period TS1, and the switch Ws[m] is turned on in the control period TS2. Accordingly, the vibration generated in the ejection portion D[m] remains in the control period TS2 as a result of the ejection portion D[m] designated as the determination target ejection portion DH being driven by the supply drive signal Vin[m] having the waveform PAL in the control period TS1. Then, in the control period TS2, the potential of the upper electrode Zu[m] provided in the ejection portion D[m] changes according to the vibration remaining in the ejection portion D[m]. Then, the detection circuit 33 detects the potential of the upper electrode Zu[m] changing according to the vibration remaining in the ejection portion D[m] as the vibration signal VX[m] via the switch Ws[m] in the control period TS2.

That is, the waveform of the vibration signal VX[m] detected from the ejection portion D[m] during the control period TS2 indicates the waveform of the vibration remaining in the ejection portion D[m] during the control period TS2. The waveform of the detection signal SK[m] generated based on the vibration signal VX[m] detected from the ejection portion D[m] in the control period TS2 indicates the waveform of the vibration remaining in the ejection portion D[m] in the control period TS2.

3. Overview of Determination Unit

Hereinafter, an overview of the determination unit 5 will be described with reference to FIGS. 8 and 9.

As described above, the determination unit 5 executes the ejection state determination processing of determining the ejection state of the ink in the ejection portion D[m] designated as the determination target ejection portion DH based on the detection signal SK[m] supplied from the detection circuit 33.

FIG. 8 is a timing chart showing an example of the detection signal SK[m] supplied from the detection circuit 33 to the determination unit 5. The detection signal SK[m] output by the detection circuit 33 during the control period TS2 exhibits a waveform based on the vibration remaining in the ejection portion D[m] during the control period TS2.

As shown in FIG. 8, hereinafter, a period from the timing when the potential of the detection signal SK[m] coincides with the reference potential VK0 set near the amplitude center of the detection signal SK[m] to the next timing when the potential coincides with the reference potential VK0 is referred to as a cycle period NTC[m]. Hereinafter, a time length of the cycle period NTC[m] is referred to as a period TC[m] of the detection signal SK[m]. In the embodiment, the cycle TC[m] is an example of "feature value exhibited by the detection signal SK[m]".

In the embodiment, in the cycle period NTC[m], a potential difference between a highest potential VKH[m] of the detection signal SK[m] and a lowest potential VKL[m] of the detection signal SK[m] is regarded as the amplitude AK[m] of the detection signal SK[m].

In the embodiment, the determination unit 5 measures the cycle TC[m] and the amplitude AK[m] of the detection signal SK[m]. Then, the determination unit 5 determines the ejection state of the ink in the ejection portion D[m] based on the cycle TC[m], and executes the ejection state determination processing of generating the determination result information SH1[m] indicating the determination result. Then, the determination unit 5 generates result information SH including the determination result information SH1[m] and the amplitude information SH2[m] indicating the amplitude AK[m], and supplies the generated result information SH to the control unit 2.

FIG. 9 is a diagram for explanation of an example of generation of the determination result information SH1[m] in the ejection state determination processing of the determination unit 5.

As shown in FIG. 9, in the ejection state determination processing, the determination unit 5 compares the cycle TC[m] with part or all of a threshold Tth1, a threshold Tth2, and a threshold Tth3 to determine the ejection state of the ink in the ejection portion D[m], and generates determination result information SH1[m] indicating the determination result.

The threshold Tth1 is fixed value for indicating the cycle TC[m] of the residual vibration generated in the ejection portion D[m] when the ejection state of the ejection portion D[m] is normal and the cycle TC[m] of the residual vibration generated in the ejection portion D[m] when air bubbles are mixed in the cavity CV[m] of the ejection portion D[m].

The threshold value Tth2 is a value larger than the threshold value Tth1, and is a fixed value for indicating boundary between the cycle TC[m] of the residual vibration generated in the ejection portion D[m] when the ejection state of the ejection portion D[m] is normal and the cycle TC[m] of the residual vibration generated in the ejection portion D[m] when foreign matter adheres to the vicinity of the nozzle N[m] of the ejection portion D[m].

The threshold value Tth3 is a value larger than the threshold value Tth2, and is a fixed value for indicating boundary between the cycle TC[m] of the residual vibration generated in the ejection portion D[m] when foreign matter adheres to the vicinity of the nozzle N[m] of the ejection portion D[m] and the cycle TC[m] of the residual vibration generated in the ejection portion D[m] when the ink in the cavity CV[m] of the ejection portion D[m] increases in viscosity.

In the embodiment, the threshold Tth1, the threshold Tth2, and the threshold Tth3 are examples of "fixed reference values".

In the embodiment, in the ejection state determination processing, when the cycle TC[m] satisfies "Tth1≤TC[m]≤Tth2", the determination unit 5 regards the ejection state of the ink in the ejection portion D[m] as normal, and sets a value "1" indicating that the ejection state of the ink in the ejection portion D[m] is normal to the determination result information SH1[m].

Further, in the ejection state determination processing, when the cycle TC[m] satisfies "TC[m]<Tth1", the determination unit 5 regards that an ejection abnormality due to air bubbles occurs in the ejection portion D[m], and sets a value "2" indicating that an ejection abnormality due to air bubbles occurs in the ejection portion D[m] to the determination result information SH1[m].

Furthermore, in the ejection state determination processing, when the cycle TC[m] satisfies "Tth2<TC[m]≤Tth3", the determination unit 5 regards that an ejection abnormality due to adhesion of foreign matter occurs in the ejection portion D[m], and sets a value "3" indicating that an ejection abnormality due to adhesion of foreign matter occurs in the ejection portion D[m] to the determination result information SH1[m].

In addition, in the ejection state determination processing, when the cycle TC[m] satisfies "Tth3<TC[m]", the determination unit 5 regards that ejection abnormality due to an increase in viscosity occurs in the ejection portion D[m], and sets a value "4" indicating that an ejection abnormality due to an increase in viscosity occurs in the ejection portion D[m] to the determination result information SH1[m].

In the embodiment, the case where the determination unit 5 can compare the cycle TC[m] with the three thresholds of the threshold Tth1, the threshold Tth2, and the threshold Tth3 is exemplified, but the present disclosure is not limited to the configuration. It is only necessary that the determination unit 5 can compare the cycle TC[m] with one or more thresholds of the three thresholds of the threshold Tth1, the threshold Tth2, and the threshold Tth3.

As described above, the determination unit 5 generates the result information SH including the determination result information SH1[m] indicating the result of the determination of the ejection state of the ink in the ejection portion D[m] and the amplitude information SH2[m] indicating the amplitude AK[m] of the detection signal SK[m] based on the detection signal SK[m].

In general, the amplitude of the vibration signal VX[m] varies according to the temperature and the viscosity of the ink ejected by the ejection portion D[m]. Accordingly, the amplitude AK[m] of the detection signal SK[m] also varies according to the temperature and the viscosity of the ink ejected by the ejection portion D[m]. In general, the amplitude of the vibration signal VX[m] varies according to the degree of deterioration of the piezoelectric element PZ[m] of the ejection portion D[m]. Accordingly, the amplitude AK[m] of the detection signal SK[m] also varies according to the degree of deterioration of the piezoelectric element PZ[m] of the ejection portion D[m].

Therefore, when the detection circuit 33 amplifies the vibration signal VX[m] by a constant amplification factor to generate the detection signal SK[m] and the determination unit 5 executes the ejection state determination processing on the ejection portion D[m] based on the detection signal SK[m] as in the related art, the amplitude AK[m] of the detection signal SK[m] may be an amplitude inappropriate for the ejection state determination processing. Specifically, when the detection circuit 33 amplifies the vibration signal VX[m] by a constant amplification factor as in the related art, the amplitude AK[m] of the detection signal SK[m] becomes larger than a predetermined upper-limit amplitude AK1, and thus the accuracy of the ejection state determination processing based on the detection signal SK[m] may be reduced. Further, when the detection circuit 33 amplifies the vibration signal VX[m] by a constant amplification factor as in the related art, the amplitude AK[m] of the detection signal SK[m] becomes smaller than a predetermined lower-limit amplitude AK2, and thus the measurement of the cycle TC[m] of the detection signal SK[m] may be difficult and the ejection state determination processing based on the detection signal SK[m] may be difficult.

In contrast, according to the embodiment, as described above, the amplification factor setting section 24 sets the amplification n factor AG[m] based on the designation signal and the temperature signal ST. According to the embodiment, as described above, the detection circuit 33 amplifies the vibration signal VX[m] according to the amplification factor AG[m] to generate the detection signal SK[m]. Therefore, according to the embodiment, the amplitude AK[m] of the detection signal SK[m] can be set to fall within a predetermined amplitude range from the lower-limit amplitude AK2 to the upper-limit amplitude AK1 including a reference amplitude AK0 suitable for the ejection state determination processing. Thereby, according to the embodiment, the accuracy of the amplification factor setting process based on the detection signal SK[m] can be higher as compared with the case where the detection circuit 33 amplifies the vibration signal VX[m] at a constant amplification factor as in the related art.

4. Amplification Factor Setting Processing

Hereinafter, an overview of the amplification factor setting processing will be described with reference to FIGS. 10 to 13.

Figure 10:
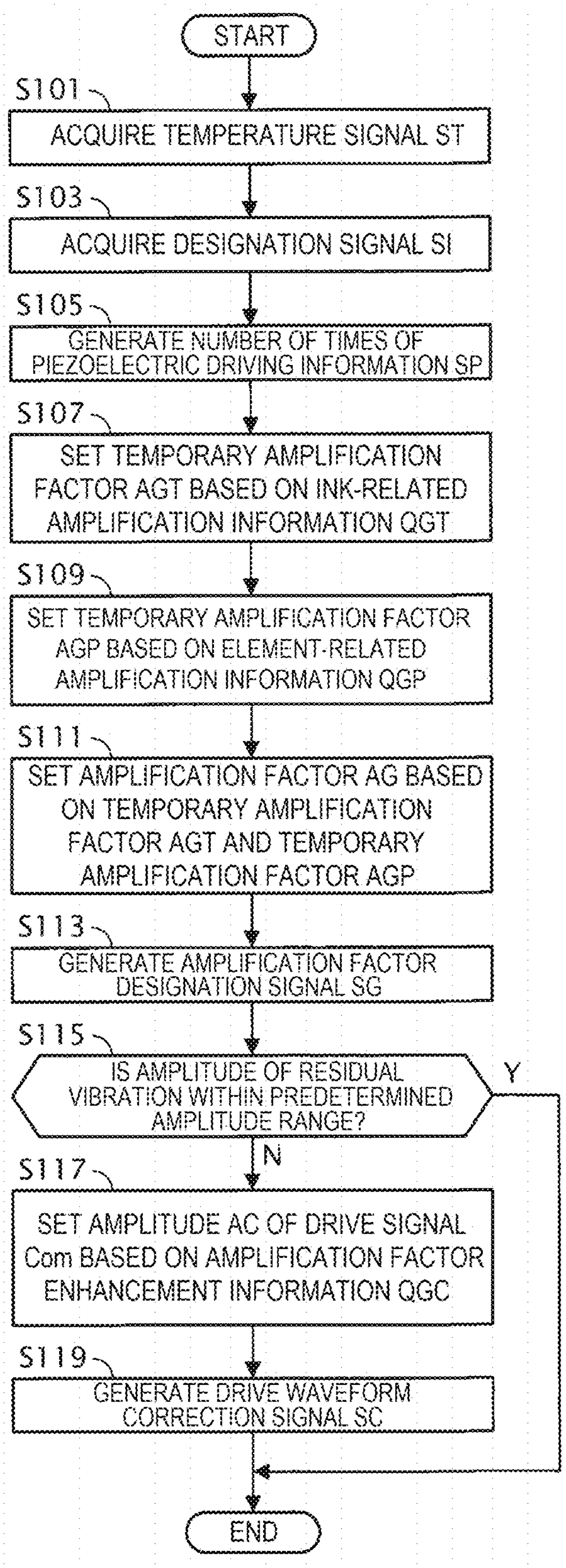
FIG. 10 is a flowchart for explanation of an example of amplification factor setting processing.

FIG. 10 is a flowchart showing an example of the operation of the control unit 2 when the amplification factor setting processing is executed.

As shown in FIG. 10, when the amplification factor setting processing is started, the amplification factor setting section 24 acquires the temperature signal ST from the temperature sensor 35 (S101).

The amplification factor setting section 24 acquires the designation signal SI from the ejection control section 22 (S103).

Then, the amplification factor setting section 24 generates the number of times of piezoelectric driving information SP indicating the number of times of piezoelectric driving AP[m] based on the designation signal SI acquired at step S103 (S105).

Specifically, the amplification factor setting section 24 stores the number of times of piezoelectric driving information SP generated at step S105 in the memory unit 6 in one piece of amplification factor setting processing. Then, the amplification factor setting section 24 acquires the number of times of piezoelectric driving information SP stored in the memory unit 6 at step S105 of another piece of amplification factor setting processing executed next to the one piece of amplification factor setting processing. Then, at step S105 of the other piece of amplification factor setting processing, the amplification factor setting section 24 updates the number of times of piezoelectric driving AP[m] by adding the number of times of driving of the ejection portion D[m] indicated by the designation signal SI acquired at step S103 of the other piece of amplification factor setting processing to the number of times of piezoelectric driving AP[m] indicated by the number of times of piezoelectric driving information SP acquired from the memory unit 6, and generates the number of times of piezoelectric driving information SP indicating the updated number of times of piezoelectric driving AP[m].

As shown in FIG. 10, the amplification factor setting section 24 sets a temporary amplification factor AGT[m] based on the temperature signal ST acquired at step S101 and the ink-related amplification information QGT stored in the memory unit 6 (S107).

Figure 11:
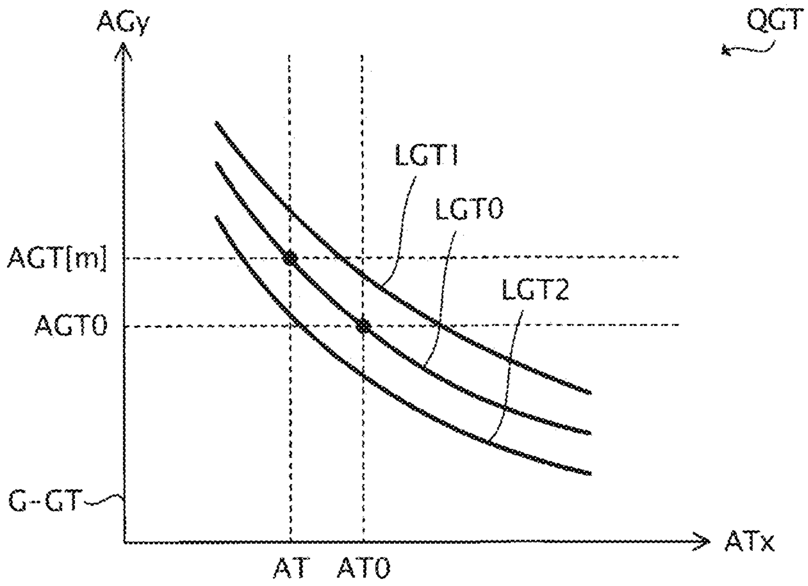
FIG. 11 is a diagram for explanation of an example of ink-related amplification information QGT.

FIG. 11 is a diagram for explanation of an example of the ink-related amplification information QGT.

As shown in FIG. 11, the ink-related amplification information QGT is information indicating a curve LGT0 representing a combination of the amplification factor AG[m] and the temperature AT for maintaining the amplitude AK[m] of the detection signal SK[m] to be the reference amplitude AK0 in a graph G-GT in which the horizontal axis represents a temperature coordinate value ATx corresponding to the temperature AT and the vertical axis represents an amplification factor coordinate value AGy corresponding to the amplification factor AG[m]. Specifically, the ink-related amplification information QGT is information indicating coordinates of each of a plurality of points on the curve LGT0 in the graph G-GT. For example, in FIG. 11, a point where the temperature coordinate value ATx becomes the reference temperature AT0 and the amplification factor coordinate value AGy becomes the reference amplification factor AGT0 is a point on the curve LGT0. Therefore, when the temperature AT becomes the reference temperature AT0 and the amplification factor AG[m] becomes the reference amplification factor AGT0, the amplitude AK[m] of the detection signal SK[m] becomes the reference amplitude AK0.

The ink-related amplification information QGT is information indicating a curve LGT1 representing a combination of the amplification factor AG[m] and the temperature AT for maintaining the amplitude AK[m] of the detection signal SK[m] to be the upper-limit amplitude AK1. Specifically, the ink-related amplification information QGT is information indicating coordinates of each of a plurality of points on the curve LGT1 in the graph G-GT.

The ink-related amplification information QGT is information indicating a curve LGT2 representing a combination of the amplification factor AG[m] and the temperature AT for maintaining the amplitude AK[m] of the detection signal SK[m] to be the lower-limit amplitude AK2. Specifically, the ink-related amplification information QGT is information indicating coordinates of each of a plurality of points on the curve LGT2 in the graph G-GT.

At step S107 of the amplification factor setting processing, the amplification factor setting section 24 specifies a point on the curve LGT0 having the temperature AT indicated by the temperature signal ST acquired at step S101 as the temperature coordinate value ATx by referring to the ink-related amplification information QGT. In the embodiment, the amplification factor setting section 24 sets the amplification factor coordinate value AGy corresponding to the specified point on the curve LGT0 as the temporary amplification factor AGT[m]. In the embodiment, when the temperature AT indicated by the temperature signal ST is lower, the amplification factor setting section 24 compares the factor with that when the temperature is higher, and sets the temporary amplification factor AGT[m] to a larger value.

In the embodiment, the case where the amplification factor coordinate value AGy corresponding to the point on the curve LGT0 is set as the temporary amplification factor AGT[m] is exemplified, but the present disclosure is not limited to the configuration. For example, at step S107, the amplification factor setting section 24 may set, as the temporary amplification factor AGT[m], an amplification factor coordinate value AGy in a range of not less than the amplification factor coordinate value AGy corresponding to a point on the curve LGT2 having the temperature AT indicated by the temperature signal ST acquired at step S101 as the temperature coordinate value ATx and not more than the amplification factor coordinate value AGy corresponding to a point on the curve LGT1 having the temperature AT indicated by the temperature signal ST acquired at step S101 as the temperature coordinate value ATx.

In the embodiment, the ink-related amplification information QGT is an example of "first amplification information".

As shown in FIG. 10, the amplification factor setting section 24 sets a temporary amplification factor AGP[m] based on the number of times of piezoelectric driving information SP generated at step S105 and the element-related amplification information QGP stored in the memory unit 6 (S109).

Figure 12:
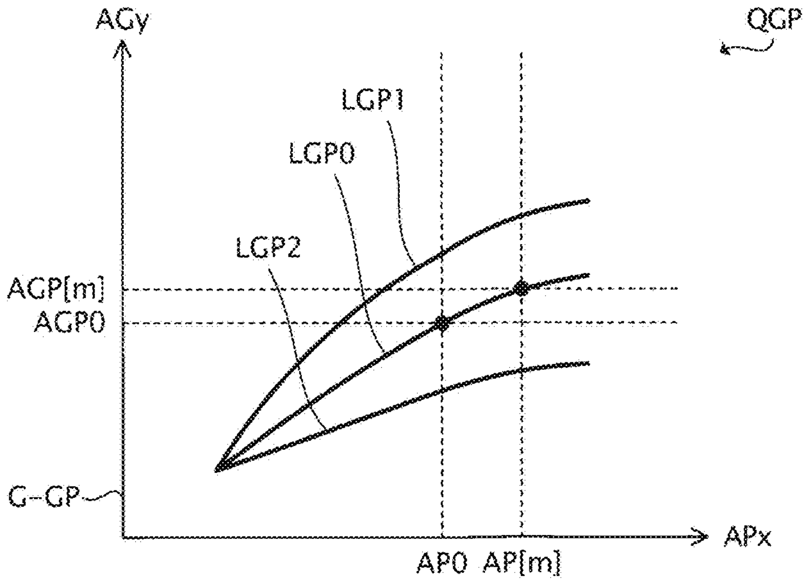
FIG. 12 is a diagram for explanation of an example of element-related amplification information QGP.

FIG. 12 is a diagram for explanation of an example of the element-related amplification information QGP.

As shown in FIG. 12, the element-related amplification information QGP is information indicating a curve LGP0 representing a combination of the amplification factor AG[m] and the number of times of piezoelectric driving AP[m] for maintaining the amplitude AK[m] of the detection signal SK[m] to be the reference amplitude AK0 in a graph G-GP in which the horizontal axis represents a number of times of coordinate driving value APx corresponding to the number of times of piezoelectric driving AP[m] and the vertical axis represents the amplification factor coordinate value AGy corresponding to the amplification factor AG[m]. Specifically, the element-related amplification information QGP is information indicating coordinates of each of a plurality of points on the curve LGP0 in the graphs G-GP. For example, in FIG. 12, a point where the number of times of driving coordinate value APx becomes a reference number of times of piezoelectric driving APO and the amplification factor coordinate value AGy becomes the reference amplification factor AGP0 is a point on the curve LGP0. Therefore, when the number of times of piezoelectric driving AP[m] becomes the reference number of times of piezoelectric driving APO and the amplification factor AG[m] becomes the reference amplification factor AGP0, the amplitude AK[m] of the detection signal SK[m] becomes the reference amplitude AK0.

The element-related amplification information QGP is information indicating a curve LGP1 representing a combination of the amplification factor AG[m] and the number of times of piezoelectric driving AP[m] for maintaining the amplitude AK[m] of the detection signal SK[m] to be the upper-limit amplitude AK1. Specifically, the element-related amplification information QGP is information indicating coordinates of each of a plurality of points on the curve LGP1 in the graphs G-GP.

The element-related amplification information QGP is information indicating a curve LGP2 representing a combination of the amplification factor AG[m] and the number of times of piezoelectric driving AP[m] for maintaining the amplitude AK[m] of the detection signal SK[m] to be the lower-limit amplitude AK2. Specifically, the element-related amplification information QGP is information indicating coordinates of each of a plurality of points on the curve LGP2 in the graph G-GP.

At step S109, the amplification factor setting section 24 specifies a point on the curve LGP0 having the number of times of piezoelectric driving AP[m] indicated by the number of times of piezoelectric driving information SP generated at step S105 as the number of times of driving coordinate value APx by referring to the element-related amplification information QGP. In the embodiment, the amplification factor setting section 24 sets the amplification factor coordinate value AGy corresponding to the specified point on the curve LGP0 as the temporary amplification factor AGP[m]. In the embodiment, when the number of times of piezoelectric driving AP[m] indicated by the number of times of piezoelectric driving information SP is a large value, the amplification factor setting section 24 compares the factor with that when the number is a smaller value, and sets the temporary amplification factor AGP[m] to a larger value.

In the embodiment, the case where the amplification factor coordinate value AGy corresponding to a point on the curve LGP0 is set as the temporary amplification factor AGP[m] is exemplified, but the present disclosure is not limited to the configuration. For example, at step S109, the amplification factor setting section 24 may set, as the temporary amplification factor AGP[m], the amplification factor coordinate value AGy in a range not less than the amplification factor coordinate value AGy corresponding to a point on the curve LGP2 having the number of times of piezoelectric driving AP[m] indicated by the number of times of piezoelectric driving information SP generated at step S105 as the number of times of driving coordinate value APx and not more than the amplification factor coordinate value AGy corresponding to a point on the curve LGP1 having the number of times of piezoelectric driving AP[m] indicated by the number of times of piezoelectric driving information SP generated at step S105 as the number of times of driving coordinate value APx.

In the embodiment, the element-related amplification information QGP is an example of "second amplification information".

As shown in FIG. 10, the amplification factor setting section 24 sets the amplification factor AG[m] based on the temporary amplification factor AGT[m] set at step S107 and the temporary amplification factor AGP[m] set at step S109 (S111).

Specifically, at step S111, the amplification factor setting section 24 sets the amplification factor AG[m] based on a degree of a difference between the temporary amplification factor AGT[m] and the reference amplification factor AGT0 and a degree of a difference between the temporary amplification factor AGP[m] and the reference amplification factor AGP0. At step S111, when the temporary amplification factor AGT[m] is larger than the reference amplification factor AGT0, the amplification factor setting section 24 compares the amplification factor with that when the temporary amplification factor is smaller and sets the amplification factor AG[m] to a larger value, and when the temporary amplification factor AGP[m] is larger than the reference amplification factor AGP0, the section compares the amplification factor with that when the temporary amplification factor is smaller and sets the amplification factor AG[m] to a larger value. In the embodiment, at step S111, as an example, the amplification factor setting section 24 sets the amplification factor AG[m] based on a ratio of the temporary amplification factor AGT[m] to the reference amplification factor AGT0 and a ratio of the temporary amplification factor AGP[m] to the reference amplification factor AGP0. That is, in the embodiment, at step S111, as an example, the amplification factor setting section 24 sets the amplification factor AG[m] based on the following expression (1).

$$AG[m] = AG0 \times \{AGT[m] \div AGT0\} \times \{AGP[m] \div AGP0\} \quad (1)$$

The reference amplification factor AG0 shown in the expression (1) is such an amplification factor AG[m] that the amplitude AK[m] of the detection signal SK[m] becomes the reference amplitude AK0 when the temperature AT is the reference temperature AT0, the number of times of piezoelectric driving AP[m] is the reference number of times of piezoelectric driving APO, and the amplification factor AG[m] is the reference amplification factor AG0. Hereinafter, the right side of the expression (1) "AG0×{AGT[m]÷AGT0}×{AGP[m]÷AGP0}" is referred to as a target amplification factor AGM[m].

In the embodiment, it is assumed that the detection circuit 33 can amplify the vibration signal VX[m] by an amplification factor AG[m] equal to or higher than the minimum amplification factor AG-min and equal to or lower than the maximum amplification factor AG-max. Accordingly, at step S111, the amplification factor setting section 24 sets the amplification factor AG[m] as the minimum amplification factor AG-min when the following expression (2) is satisfied, sets the amplification factor AG[m] as the maximum amplification factor AG-max when the following expression (3) is satisfied, and sets the amplification factor AG[m] as the target amplification factor AGM[m] when neither of the following expressions (2) and (3) is satisfied.

$$AGM[m] < AG - \mathrm{min} \quad (2)$$

$$AG - \mathrm{max} < AGM[m] \quad (3)$$

Then, the amplification factor setting section 24 generates the amplification factor designation signal SG indicating the amplification factor AG[m] and supplies the generated amplification factor designation signal SG to the detection circuit 33 (S113).

Then, the amplification factor setting section 24 determines whether the amplitude AK[m] of the detection signal SK[m] obtained when circuit 33 amplifies the vibration signal VX[m] falls within a predetermined amplitude range based on the amplification factor AG[m] indicated by the amplification factor designation signal G supplied at step S113 (S115). Specifically, at step S115, the amplification factor setting section 24 determines whether the amplification factor AG[m] set at step S111 is the target amplification factor AGM[m]. For example, at step S115, the amplification factor setting section 24 may determine whether the following expression (4) is satisfied.

$$AG - \mathrm{min} \le AGM[m] \le AG - \mathrm{max} \quad (4)$$

When the result of the determination at step S115 is positive, the amplification factor setting section 24 ends the amplification factor setting processing.

When the result of the determination at step S115 is negative, the amplification factor setting section 24 sets the amplitude AC based on the amplification factor enhancement information QGC (S117). In the embodiment, the amplitude AC is a potential difference between the potential VH1 and the potential VL1.

Figure 13:
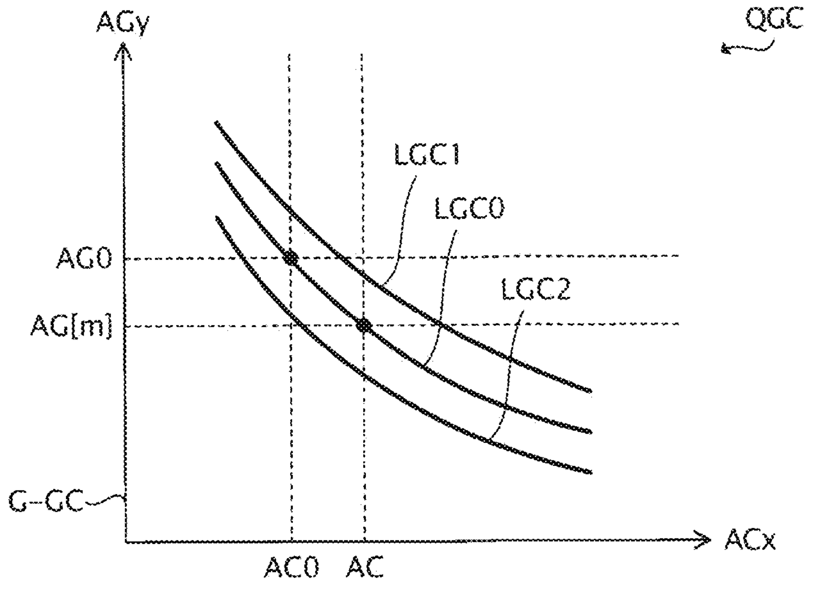
FIG. 13 is a diagram for explanation of an example of amplification factor enhancement information QGC.

FIG. 13 is a diagram for explanation of an example of the amplification factor enhancement information QGC.

As shown in FIG. 13, the amplification factor enhancement information QGC is information indicating a curve LGC0 representing a combination of the amplification factor AG[m] and the amplitude AC for maintaining the amplitude AK[m] of the detection signal SK[m] to be the reference amplitude AK0 in a graph G-GC in which the horizontal axis represents the amplitude coordinate value ACx corresponding to the amplitude AC and the vertical axis represents the amplification factor coordinate value AGy corresponding to the amplification factor AG[m]. Specifically, the amplification factor enhancement information QGC is information indicating coordinates of each of a plurality of points on the curve LGC0 in the graphs G-GC. For example, in FIG. 13, a point where the amplitude coordinate value ACx becomes the reference amplitude AC0 and the amplification factor coordinate value AGy becomes the reference amplification factor AG0 is a point on the curve LGC0. Accordingly, when the amplitude AC becomes the reference amplitude AC0 and the amplification factor AG[m] becomes the reference amplification factor AG0, the amplitude AK[m] of the detection signal SK[m] becomes the reference amplitude AK0.

The amplification factor enhancement information QGC is information indicating a curve LGC1 representing a combination of the amplification factor AG[m] and the amplitude AC for maintaining the amplitude AK[m] of the detection signal SK[m] to be the upper-limit amplitude AK1. Specifically, the amplification factor enhancement information QGC is information indicating coordinates of each of a plurality of points on the curve LGC1 in the graphs G-GC.

The amplification factor enhancement information QGC is information indicating a curve LGC2 representing a combination of the amplification factor AG[m] and the amplitude AC for maintaining the amplitude AK[m] of the detection signal SK[m] to be the lower-limit amplitude AK2. Specifically, the amplification factor enhancement information QGC is information indicating coordinates of each of a plurality of points on the curve LGC2 in the graphs G-GC.

At step S117, the amplification factor setting section 24 specifies a point on the curve LGC0 having the amplification factor AG[m] set at step S111 as the amplification factor coordinate value AGy. Then, the amplification factor setting section 24 sets the amplitude coordinate value ACx corresponding to the specified point on the curve LGC0 as the amplitude AC. In the embodiment, when the amplification factor AG[m] indicated by the amplification factor designation signal SG is a small value, the amplification factor setting section 24 compares the amplitude with that when the amplification factor AG[m] is a large value, and sets the amplitude AC to a larger value.

In the embodiment, a case where the amplitude coordinate value ACx corresponding to a point on the curve LGC0 is set as the amplitude AC is exemplified, but the present disclosure is not limited to the configuration. For example, at step S117, the amplification factor setting section 24 may set, as the amplitude AC, the amplitude coordinate value ACx in a range not less than the amplitude coordinate value ACx corresponding to a point on the curve LGC2 having the amplification factor AG[m] set at step S111 as the amplification factor coordinate value AGy and is not more than the amplitude coordinate value ACx corresponding to a point on the curve LGC1 having the amplification factor AG[m] set at step S111 as the amplification factor coordinate value AGy.

As shown in FIG. 10, the amplification factor setting section 24 generates the drive waveform correction signal SC indicating the amplitude AC set at step S117, supplies the generated drive waveform correction signal SC to the drive control section 21 (S119), and ends the amplification factor setting processing.

5. Conclusion of Embodiment

As described above, the inkjet printer 1 according to the embodiment includes the ejection portion D[m] including the piezoelectric element PZ[m] driven by the drive signal Com, the cavity CV[m] filled with an ink and having a volume that changes according to the driving of the piezoelectric element PZ[m], and the nozzle N[m] that ejects the liquid in the cavity CV[m] according to the change of the volume of the cavity CV[m], the detection circuit 33 that detects the vibration signal VX[m] indicating the potential of the piezoelectric element PZ[m] that varies according to the vibration remaining in the ejection portion D[m] after the driving of the piezoelectric element PZ[m], and generates the detection signal SK[m] based on the detected vibration signal VX[m], and the amplification factor setting section 24 that sets the amplification factor AG[m] based on the temperature signal ST indicating a value related to the temperature of the ink ejected by the ejection portion D[m], and the number of times of piezoelectric driving information SP indicating a value related to the number of times of driving of the piezoelectric element PZ[m], and the detection circuit 33 generates the detection signal SK[m] by amplifying the vibration signal VX[m] according to the amplification factor AG[m] set by the amplification factor setting section 24.

As described above, according to the embodiment, the detection circuit 33 generates the detection signal SK[m] by amplifying the vibration signal VX[m] according to the amplification factor AG[m] set by the amplification factor setting section 24 based on the temperature signal ST and the number of times of piezoelectric driving information SP. Therefore, according to the embodiment, the detection signal SK[m] suitable for determination of the ejection state of the ink in the ejection portion D[m] may be generated as compared with the case where the detection circuit 33 amplifies the vibration signal VX[m] at a constant amplification factor.

The inkjet printer 1 according to the embodiment includes the determination unit 5 that determines whether the ejection state of the ink in the ejection portion D[m] is normal by comparing the cycle TC[m] indicated by the detection signal SK[m] with part or all of the threshold Tth1, the threshold Tth2, and the threshold Tth3, and the threshold Tth1, the threshold Tth2, and the threshold Tth3 include fixed reference values that do not vary even when the temperature of the ink indicated by the temperature signal ST varies, and do not vary even when the number of times of driving of the piezoelectric element PZ[m] indicated by the number of times of piezoelectric driving information SP varies.

As described above, according to the embodiment, since the threshold Tth1, the threshold Tth2, and the threshold Tth3 are the fixed reference values, the ejection state determination processing may be simplified as compared to a mode in which the threshold Tth1, the threshold Tth2, and the threshold Tth3 are varied according to the temperature AT indicated by the temperature signal ST, or a mode in which the threshold Tth1, the threshold Tth2, and the threshold Tth3 are varied according to the number of times of piezoelectric driving AP[m] indicated by the number of times of piezoelectric driving information SP.

In the inkjet printer 1 according to the embodiment, when the ink temperature AT indicated by the temperature signal ST varies, the amplification factor setting section 24 sets the amplification factor AG[m] based on the ink-related amplification information QGT indicating the amplification factor AG[m] of the vibration signal VX[m] necessary for keeping the amplitude AK[m] of the detection signal SK[m] within the predetermined amplitude range.

Therefore, according to the embodiment, the detection signal SK[m] suitable for the ejection state determination processing can be generated.

In the inkjet printer 1 according to the embodiment, when the number of times of piezoelectric driving AP[m] indicated by the number of times of piezoelectric driving information SP varies, the amplification factor setting section 24 sets the amplification factor AG[m] based on the element-related amplification information QGP indicating the amplification factor AG[m] of the vibration signal VX[m] necessary for keeping the amplitude AK[m] of the detection signal SK[m] within the predetermined amplitude range.

Therefore, according to the embodiment, the detection signal SK[m] suitable for the ejection state determination processing can be generated.

The inkjet printer 1 according to the embodiment includes the drive signal generation unit 4 generating the drive signal Com, and the drive signal generation unit 4 corrects the amplitude AC of the drive signal Com to keep the amplitude AK[m] of the detection signal SK[m] within the predetermined amplitude range when the amplitude AK[m] of the detection signal SK[m] is hard to be kept within the predetermined amplitude range by the detection circuit 33 amplifying the vibration signal VX[m].

Therefore, according to the embodiment, the detection signal SK[m] suitable for the ejection state determination processing can be generated.

In the inkjet printer 1 according to the embodiment, the temperature signal ST indicates the temperature AT corresponding to the temperature of the ink ejected by the ejection portion D[m], and when the temperature AT indicated by the temperature signal ST is lower, the amplification factor AG[m] is compared with that when the temperature is higher and set to a larger value.

Therefore, according to the embodiment, even when the temperature of the ink ejected by the ejection portion D[m] becomes low and the viscosity of the ink ejected by the ejection portion D[m] becomes high, a decrease of the amplitude AK[m] of the detection signal SK[m] can be suppressed and the detection signal SK[m] suitable for the ejection state determination processing can be generated.

B. Modifications

The above embodiments can be variously modified. Specific modifications are exemplified below. Two or more of the configurations which are freely selected from the following exemplifications may be suitably combined in a range which is not mutually contradictory. In the modifications exemplified below, elements having the same functions and functions as those of the embodiment have the same reference signs as used in the above description, and the detailed description thereof will be omitted as appropriate.

Modification 1

In the above described embodiment, the configuration in which the amplification factor setting section 24 sets the amplification factor AG[m] without using the result information SH and the detection signal SK[m] is exemplified, but the present disclosure is not limited to the configuration. The amplification factor setting section 24 may set the amplification factor AG[m] based on the amplitude SH2[m] contained in the result information SH or the detection signal SK[m].

Figure 14:
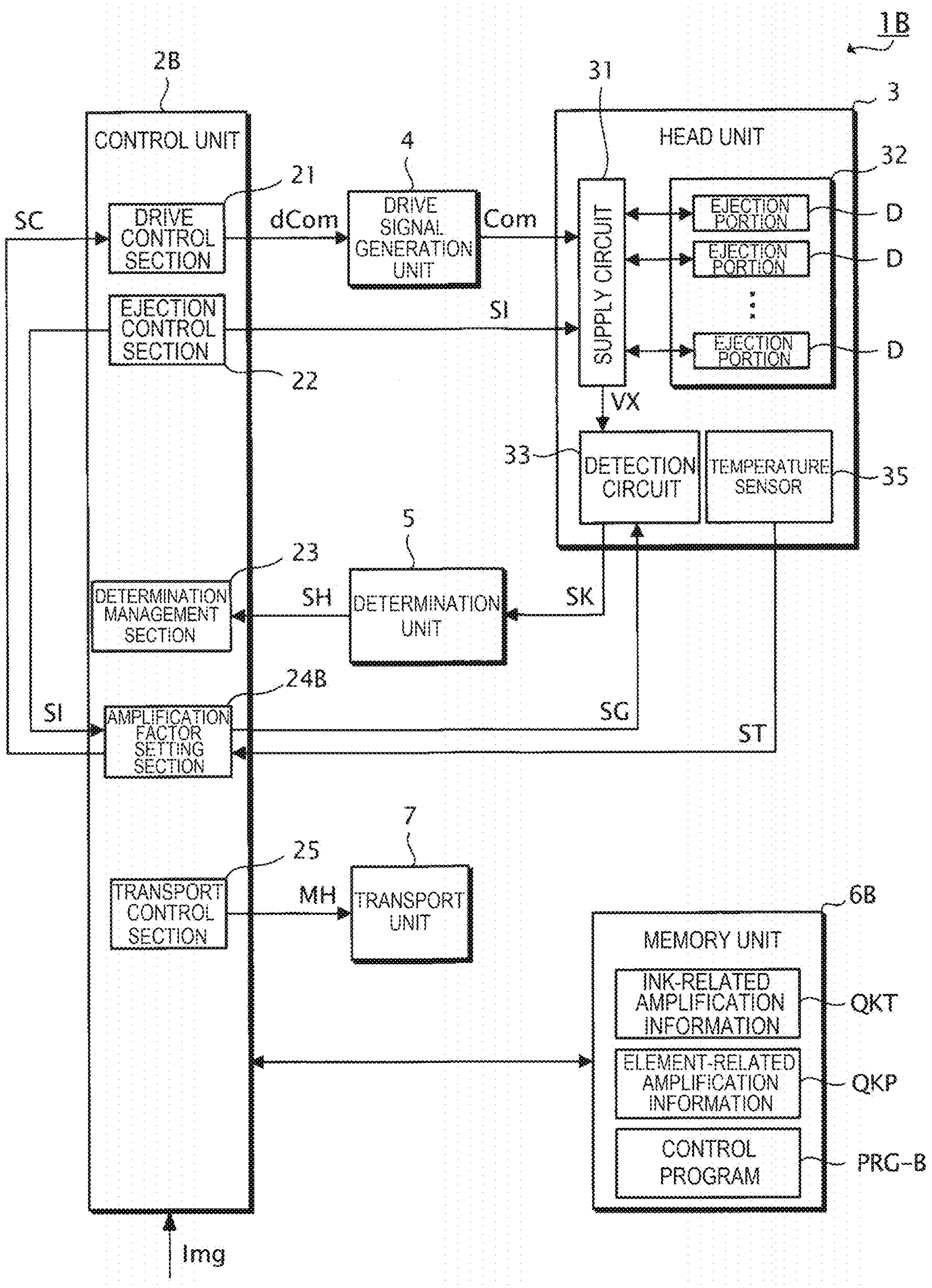
FIG. 14 is a block diagram showing an example of a configuration of an inkjet printer 1B according to Modification 1 of the present disclosure.

FIG. 14 is a functional block diagram showing an example of a configuration of an inkjet printer 1B according to the modification.

As shown in FIG. 14, the inkjet printer 1B differs from the inkjet printer 1 according to the embodiment in that a control unit 2B is provided instead of the control unit 2, and a memory unit 6B is provided instead of the memory unit 6.

The memory unit 6B stores ink-related amplitude information QKT, element-related amplitude information QKP, and a control program PRG-B.

The control unit 2B executes the control program PRG-B stored in the memory unit 6B and operates according to the control program PRG-B to function as the drive control section 21, the ejection control section 22, the determination management section 23, an amplification factor setting section 24B, and the transport control section 25. That is, the control unit 2B is different from the control unit 2 according to the embodiment in that the amplification factor setting section 24B is provided instead of the amplification factor setting section 24.

Figure 15:
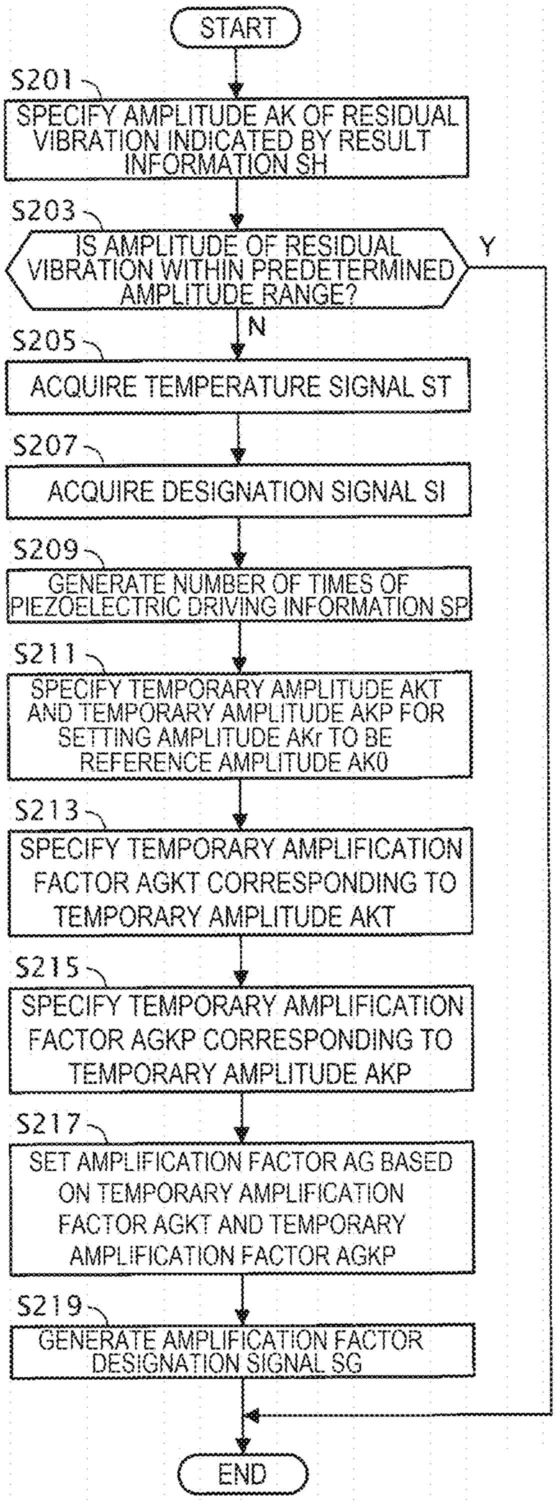
FIG. 15 is a flowchart for explanation of an example of amplification factor setting processing according to Modification 1.

FIG. 15 is a flowchart showing an example of the operation of the control unit 2B when amplification factor setting processing according to the modification is executed.

As shown in FIG. 15, when the amplification factor setting processing is started, the amplification factor setting section 24B acquires the result information SH from the determination unit 5 and specifies the amplitude AK[m] indicated by the amplitude information SH2[m] contained in the result information SH (S201). At step S201, the amplification factor setting section 24B may acquire the detection signal SK[m] instead of the amplitude information SH2[m] and specify the amplitude AK[m] based on the detection signal SK[m]. Hereinafter, the amplitude AK[m] specified by the amplification factor setting section 24B at step S201 is referred to as a present amplitude AKr[m].

Next, the amplification factor setting section 24B determines whether the present amplitude AKr[m] specified at step S201 falls within a predetermined amplitude range (S203). That is, at step S203, the amplification factor setting section 24B determines whether the following expression (5) is satisfied.

$$AK2 \leq AKr[m] \leq AK1 \tag{5}$$

When the result of the determination at step S203 is positive, the amplification factor setting section 24B ends the amplification factor setting processing.

When the result of the determination at step S203 is negative, the amplification factor setting section 24B acquires the temperature signal ST from the temperature sensor 35 (S205). Hereinafter, the temperature AT indicated by the temperature signal ST acquired by the amplification factor setting section 24B at step S205 is referred to as a present temperature ATr.

The amplification factor setting section 24B acquires the designation signal SI from the ejection control section 22 (S207).

Then, the amplification factor setting section 24B generates the number of times of piezoelectric driving information SP indicating the number of times of piezoelectric driving AP[m] based on the designation signal SI acquired at step S207 (S209). Hereinafter, the number of times of piezoelectric driving AP[m] indicated by the number of times of piezoelectric driving information SP generated by the amplification factor setting section 24B at step S207 is referred to as a present number of times of piezoelectric driving APr[m].

Then, the amplification factor setting section 24B specifies a temporary amplitude AKT[m] and a temporary amplitude AKP[m] that satisfy the following expression (6) (S211).

$$AK0 = AKr[m] \times \{AKT[m] \div AKr[m]\} \times \{AKP[m] \div AKr[m]\} \quad (6)$$

When there are a plurality of combinations of the temporary amplitude AKT[m] and the temporary amplitude AKP[m] at step S211, the amplification factor setting section 24B may select any one of the plurality of combinations. For example, at step S211, the amplification factor setting section 24B may select a combination in which an evaluation value VL represented by the following expression (7) is the minimum from the plurality of combinations of the temporary amplitude AKT[m] and the temporary amplitude AKP[m].

$$VL = \{AKT[m]\}^2 + \{AKP[m]\}^2 \quad (7)$$

Next, the amplification factor setting section 24B specifies a temporary amplification factor AGKT[m] corresponding to the temporary amplitude AKT[m] based on the ink-related amplitude information QKT (S213).

Figure 16:
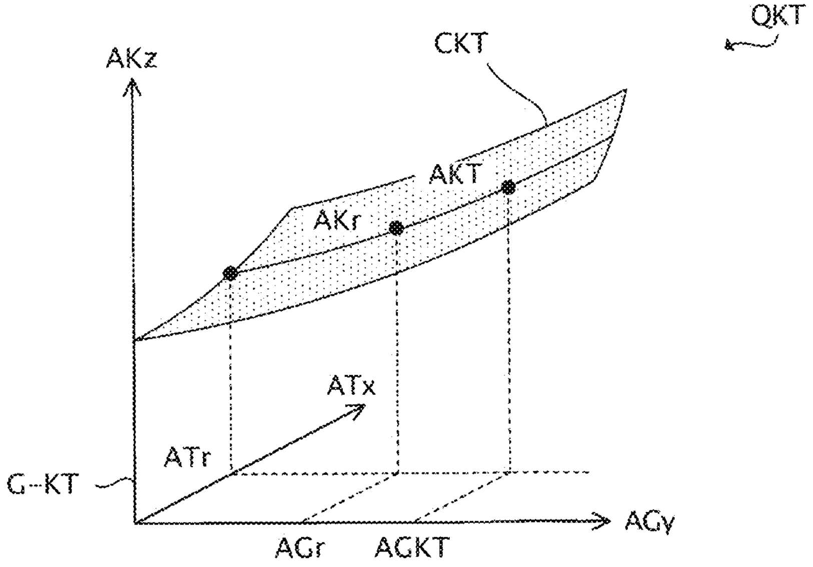
FIG. 16 is a diagram for explanation of an example of ink-related amplitude information QKT.

FIG. 16 is a diagram for explanation of an example of the ink-related amplitude information QKT.

As shown in FIG. 16, in a three-dimensional graph G-KT in which the first axis represents the temperature coordinate value ATx corresponding to the temperature AT, the second axis represents the amplification factor coordinate value AGy corresponding to the amplification factor AG[m], and the third axis represents an amplitude coordinate value AKz corresponding to the amplitude AK[m], the ink-related amplitude information QKT is information indicating a curved surface CKT indicating the amplitude AK[m] corresponding to the temperature AT indicated by the temperature signal ST and the amplification factor AG[m] indicated by the amplification factor designation signal SG. Specifically, the ink-related amplitude information QKT is information indicating coordinates of each of a plurality of points on the curved surface CKT in the graph G-KT.

For example, in FIG. 16, the amplification factor coordinate value AGy of a point on the curved surface CKT at which the temperature coordinate value ATx becomes the present temperature ATr and the amplitude AK[m] becomes the present amplitude AKr[m] becomes an initial amplification factor AGr.

At step S213, the amplification factor setting section 24B specifies the amplification factor coordinate value AGy of the point on the curved surface CKT at which the temperature coordinate value ATx becomes the present temperature ATr and the amplitude AK[m] becomes the temporary amplitude AKT[m] as the temporary amplification factor AGKT[m].

Further, the amplification factor setting section 24B specifies a temporary amplification factor AGKP[m] corresponding to the temporary amplitude AKP[m] based on the element-related amplitude information QKP (S215).

Figure 17:
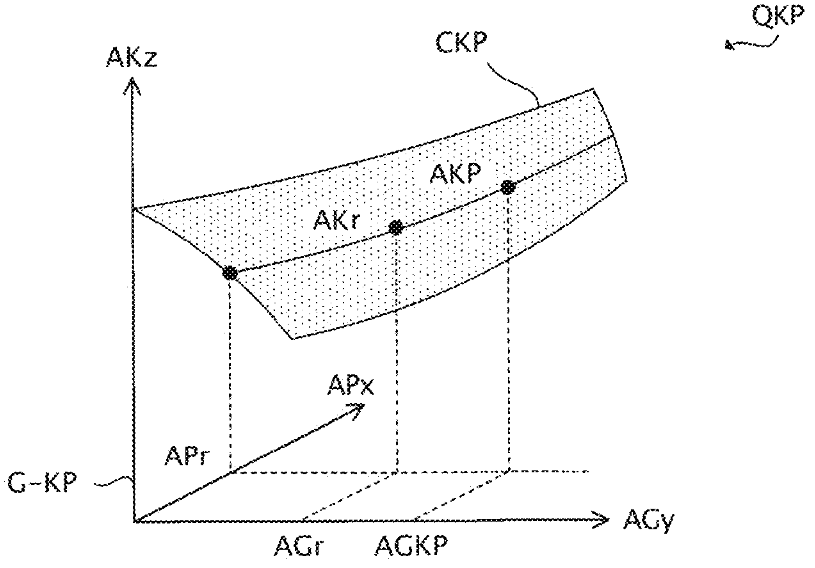
FIG. 17 is a diagram for explanation of an example of element-related amplitude information QKP.

FIG. 17 is a diagram for explanation of an example of the element-related amplitude information QKP.

As shown in FIG. 17, the element-related amplitude information QKP is information indicating the curved surface CKP representing the amplitude AK[m] corresponding to the number of times of piezoelectric driving AP[m] indicated by the number of times of piezoelectric driving information SP and the amplification factor AG[m] indicated by the amplification factor designation signal SG in a three-dimensional graph G-KP in which the first axis represents the number of times of driving coordinate value APx corresponding to the number of times of piezoelectric driving AP[m], the second axis represents the amplification factor coordinate value AGy corresponding to the amplification factor AG[m], and the third axis represents the amplitude coordinate value AKz corresponding to the amplitude AK[m]. Specifically, the element-related amplitude information QKP is information indicating coordinates of each of a plurality of points on the curved surface CKP in the graph G-KP.

For example, in FIG. 17, the amplification factor coordinate value AGy of a point on the curved surface CKP at which the number of times of driving coordinate value APx becomes the present number of times of piezoelectric driving APr[m] and the amplitude AK[m] becomes the present amplitude AKr[m] becomes the initial amplification factor AGr.

At step S215, the amplification factor setting section 24B specifies, as the temporary amplification factor AGKP[m], the amplification factor coordinate value AGy of the point on the curved surface CKP at which the number of times of driving coordinate value APx becomes the present number of times of piezoelectric driving APr[m] and the amplitude AK[m] becomes the temporary amplitude AKP[m].

Next, the amplification factor setting section 24B sets the amplification factor AG[m] based on the temporary amplification factor AGKT[m] specified at step S213 and the temporary amplification factor AGKP[m] specified at step S215 (S217).

Specifically, at step S217, the amplification factor setting section 24B may set the amplification factor AG[m] based on a degree of a difference between the temporary amplification factor AGKT[m] and the reference amplification factor AGT0 and a degree of a difference between the temporary amplification factor AGKP[m] and the reference amplification factor AGP0. At step S217, when the temporary amplification factor AGKT[m] is larger than the reference amplification factor AGT0, the amplification factor setting section 24B may compare the amplification factor with that when the temporary amplification factor is smaller and set the amplification factor AG[m] to a larger value, and when the temporary amplification factor AGKP[m] is larger than the reference amplification factor AGP0, may compare the amplification factor with that when the temporary amplification factor is smaller and set the amplification factor AG[m] to a larger value. In the present modification, at step S217, the amplification factor setting section 24B sets the amplification factor AG[m] based on a ratio of the temporary amplification factor AGKT[m] to the reference amplification factor AGT0 and a ratio of the temporary amplification factor AGKP[m] to the reference amplification factor AGP0. That is, in the modification, the amplification factor setting section 24B sets the amplification factor AG[m] based on the following expression (8) at step S217.

$$AG[m]=AG0\times\{AGKT[m]\div AGT0\}\times\{AGKP[m]\div AGP0\} \quad (8)$$

Next, the amplification factor setting section 24B generates the amplification factor designation signal SG indicating the amplification factor AG[m], supplies the generated amplification factor designation signal SG to the detection circuit 33 (S113), and ends the amplification factor setting processing.

As described above, according to the modification, the amplification factor setting section 24B generates the detection signal SK[m] by the detection circuit 33 amplifying the vibration signal VX[m] according to the amplification factor AG[m] set based on the temperature signal ST, the number of times of piezoelectric driving information SP, and the amplitude information SH2[m]. Therefore, according to the modification, the detection signal SK[m] suitable for determination of the ejection state of the ink in the ejection portion D[m] can be generated as compared with the case where the detection circuit 33 amplifies the vibration signal VX[m] at a constant amplification factor.

Modification 2

In the above described embodiment and Modification 1, the head unit 3 includes the supply circuit 31, the recording head 32, the detection circuit 33, and the temperature sensor 35, however, the present disclosure is not limited to the configuration. The head unit 3 may include component elements other than the supply circuit 31, the recording head 32, the detection circuit 33, and the temperature sensor 35. For example, the head unit 3 may include the determination unit 5.

Modification 3

In the described embodiment and above Modifications 1 and 2, the case where that the inkjet printer 1 includes the four head units 3 is assumed, however, the present disclosure is not limited to the configuration. The inkjet printer 1 may include one to three head units 3, or may include five or more head units 3.

Modification 4

In the above described embodiment and Modifications 1 to 3, the case where the inkjet printer 1 is a serial printer is exemplified, but the present disclosure is not limited to the configuration. The inkjet printer 1 may be a so-called line printer in which a plurality of nozzles N are provided to extend wider than the width of the recording sheet PP in the head unit 3.

What is claimed is:

1. A liquid ejection apparatus comprising: an ejection portion including a piezoelectric element driven by a drive signal, a pressure chamber filled with a liquid and having a volume that changes according to driving of the piezoelectric element, and a nozzle ejecting the liquid in the pressure chamber according to a change of the volume of the pressure chamber; a detection unit detecting a vibration signal indicating a potential of the piezoelectric element that varies according to a vibration remaining in the ejection portion after driving of the piezoelectric element, and generating a detection signal based on the detected vibration signal; and a setting unit setting a signal amplification factor based on liquid characteristic information related to characteristics of the liquid ejected by the ejection portion and element characteristic information related to characteristics of the piezoelectric element, wherein the detection unit generates the detection signal by amplifying the vibration signal according to the signal amplification factor set by the setting unit.

2. The liquid ejection apparatus according to claim 1, further comprising a determination unit determining whether an ejection state of the liquid in the ejection portion is normal by comparing a feature value indicated by the detection signal with one or more reference values, wherein the one or more reference values include a fixed reference value that does not vary when the characteristic of the liquid indicated by the liquid characteristic information varies and does not vary when the characteristic of the piezoelectric element indicated by the element characteristic information varies.

3. The liquid ejection apparatus according to claim 1, wherein the setting unit sets the signal amplification factor based on first amplification information indicating an amplification factor of the vibration signal necessary for keeping an amplitude of the detection signal within a predetermined amplitude range when the characteristic of the liquid indicated by the liquid characteristic information varies.

4. The liquid ejection apparatus according to claim 1, wherein the setting unit sets the signal amplification factor based on second amplification information indicating an amplification factor of the vibration signal necessary for keeping an amplitude of the detection signal within a predetermined amplitude range when the characteristic of the piezoelectric element indicated by the element characteristic information varies.

5. The liquid ejection apparatus according to claim 1, further comprising a drive signal generation unit generating the drive signal, wherein, when an amplitude of the detection signal is not kept within a predetermined amplitude range by the detection unit amplifying the vibration signal, the drive signal generation unit corrects a waveform of the drive signal to keep the amplitude of the detection signal within the predetermined amplitude range.

6. The liquid ejection apparatus according to claim 1, wherein the liquid characteristic information indicates a temperature corresponding to a temperature of the liquid ejected by the ejection portion, and when the temperature indicated by the liquid characteristic information is lower, the signal amplification factor is compared with that when the temperature is higher and set to a larger value.

7. A liquid ejection head comprising: an ejection portion including a piezoelectric element driven by a drive signal, a pressure chamber filled with a liquid and having a volume that changes according to driving of the piezoelectric element, and a nozzle ejecting the liquid in the pressure chamber according to a change of the volume of the pressure chamber; and a detection unit detecting a vibration signal indicating a potential of the piezoelectric element that varies according to a vibration remaining in the ejection portion after driving of the piezoelectric element, and generates a detection signal based on the detected vibration signal, wherein the detection unit generates the detection signal by amplifying the vibration signal according to a signal amplification factor set based on liquid characteristic information related to characteristics of the liquid ejected by the ejection portion and element characteristic information related to characteristics of the piezoelectric element.

8. A method of controlling a liquid ejection apparatus including a piezoelectric element driven by a drive signal, a pressure chamber filled with a liquid and having a volume that changes according to driving of the piezoelectric element, and a nozzle ejecting the liquid in the pressure chamber according to a change of the volume of the pressure chamber, the method comprising: detecting a vibration signal indicating a potential of the piezoelectric element that varies according to a vibration remaining in the ejection portion after driving of the piezoelectric element; setting a signal amplification factor based on liquid characteristic information related to characteristics of the liquid ejected by the ejection portion and element characteristic information related to characteristics of the piezoelectric element; and generating a detection signal by amplifying the vibration signal according to the signal amplification factor.

9. The control method according to claim 8, further comprising determining whether an ejection state of the liquid in the ejection portion is normal by comparing a feature value indicated by the detection signal with one or more reference values, wherein the one or more reference values include a fixed reference value that does not vary when the characteristic of the liquid indicated by the liquid characteristic information varies and does not vary when the characteristic of the piezoelectric element indicated by the element characteristic information varies.

10. The control method according to claim 8, wherein when the characteristic of the liquid indicated by the liquid characteristic information varies, the signal amplification factor is set based on first amplification information indicating an amplification factor of the vibration signal necessary for keeping an amplitude of the detection signal within a predetermined amplitude range.

11. The control method according to claim 8, wherein when the characteristic of the piezoelectric element indicated by the element characteristic information varies, the signal amplification factor is set based on second amplification information indicating an amplification factor of the vibration signal necessary for keeping an amplitude of the detection signal within a predetermined amplitude range.

12. The control method according to claim 8, wherein, when an amplitude of the detection signal is not kept within a predetermined amplitude range by amplification of the vibration signal, a waveform of the drive signal is corrected to keep the amplitude of the detection signal within the predetermined amplitude range.

13. The control method according to claim 8, wherein the liquid characteristic information indicates a temperature corresponding to a temperature of the liquid ejected by the ejection portion, and when the temperature indicated by the liquid characteristic information is lower, the signal amplification factor is compared with that when the temperature is higher and set to a larger value.

* * * * *